(12) United States Patent
Ryu et al.

(10) Patent No.: US 10,375,564 B2
(45) Date of Patent: Aug. 6, 2019

(54) METHOD FOR UPDATING AREA IN WIRELESS COMMUNICATION SYSTEM, AND DEVICE THEREFOR

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Jaehyun Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/543,920

(22) PCT Filed: Jan. 14, 2016

(86) PCT No.: PCT/KR2016/000413
§ 371 (c)(1),
(2) Date: Jul. 14, 2017

(87) PCT Pub. No.: WO2016/114611
PCT Pub. Date: Jul. 21, 2016

(65) Prior Publication Data
US 2017/0374542 A1    Dec. 28, 2017

Related U.S. Application Data

(60) Provisional application No. 62/103,089, filed on Jan. 14, 2015.

(51) Int. Cl.
| H04W 8/08 | (2009.01) |
| H04W 28/14 | (2009.01) |
| H04W 52/02 | (2009.01) |
| H04W 76/28 | (2018.01) |
| H04W 88/16 | (2009.01) |
| H04W 8/12 | (2009.01) |

(52) U.S. Cl.
CPC ............. *H04W 8/08* (2013.01); *H04W 28/14* (2013.01); *H04W 52/02* (2013.01);
(Continued)

(58) Field of Classification Search
None
See application file for complete search history.

(56) References Cited

U.S. PATENT DOCUMENTS

| 2013/0301611 A1 | 11/2013 | Baghel et al. |
| 2015/0003312 A1* | 1/2015 | Jeong ................ H04W 52/0235 370/311 |

(Continued)

OTHER PUBLICATIONS

"3GPP; TSG-SA; General Packet Radio Service (GPRS) enhancements for Evolved Universal Terrestrial Radio Access Network (E-UTRAN) access (Release 13)", 3GPP TS 23.401 V13.1.0, (Dec. 2014).

(Continued)

*Primary Examiner* — Diane L Lo
(74) *Attorney, Agent, or Firm* — Dentons US LLP

(57) ABSTRACT

A method for updating an area and a device for the same in a wireless communication system is disclosed. Particularly, a method for performing a Tracking Area Update (TAU) with a Mobility Management Entity (MME) change performed by a first MME in a wireless communication system may include receiving a Context Request message from a second MME during the TAU procedure and transmitting a Context Response message to the second MME in response to the Context Request message, wherein an indication that there are downlink data buffered in the S-GW may be included in the Context Response message when downlink data is buffered in a Serving Gateway (S-GW) and a buffering time of the downlink data in the S-GW is not expired.

4 Claims, 22 Drawing Sheets

(52) U.S. Cl.
CPC ... *H04W 52/0216* (2013.01); *H04W 52/0254* (2013.01); *H04W 8/12* (2013.01); *H04W 76/28* (2018.02); *H04W 88/16* (2013.01); *Y02D 70/00* (2018.01); *Y02D 70/122* (2018.01); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/14* (2018.01); *Y02D 70/142* (2018.01); *Y02D 70/146* (2018.01); *Y02D 70/21* (2018.01); *Y02D 70/23* (2018.01); *Y02D 70/24* (2018.01)

(56) References Cited

U.S. PATENT DOCUMENTS

| | | | |
|---|---|---|---|
| 2015/0156660 A1* | 6/2015 | Luo | H04W 8/02 370/230 |
| 2016/0100362 A1* | 4/2016 | Palanisamy | H04W 52/0212 370/311 |
| 2016/0262041 A1* | 9/2016 | Ronneke | H04W 52/0216 |

OTHER PUBLICATIONS

"3GPP; TSG-SA; Study on Optimizations to Support High Latency Communications; Stage 2 (Release 13)", 3GPP TR 23.709 V0.2.0 (Nov. 2014).

LG Electronics et al., "Further clarification on downlink data delivery failure due to inter-MME/SGSN mobility", SA WG2 Meeting #106, Nov. 17-21, 2014, San Francisco, California, USA, S2-144079.

LG Electronics, "Solution Proposal—Reduction of unnecessary DDN signalling", SA WG2 Meeting S2#106, Nov. 17-21, 2014, San Francisco, California, USA, S2-144082.

* cited by examiner

[FIG. 1]
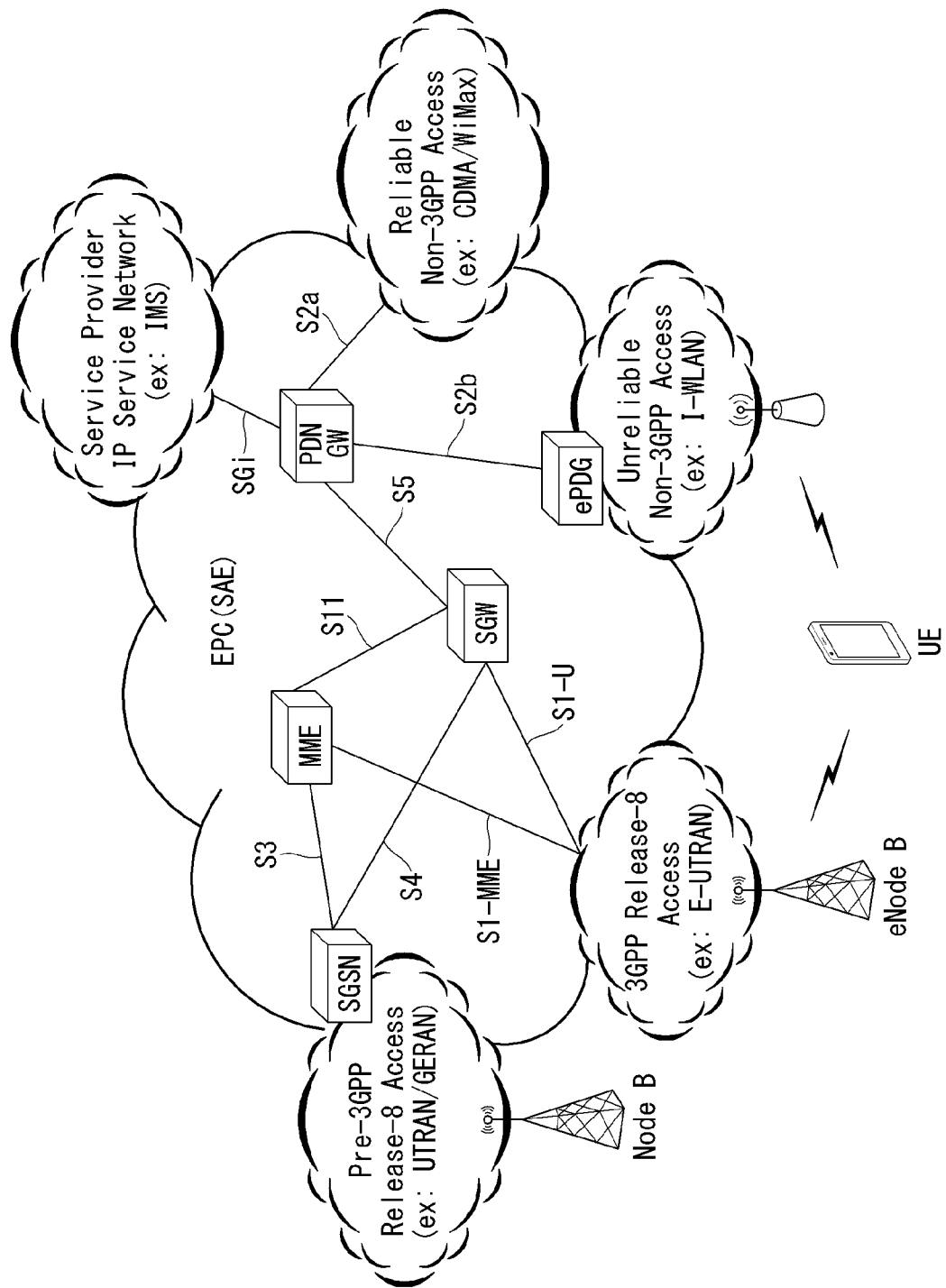

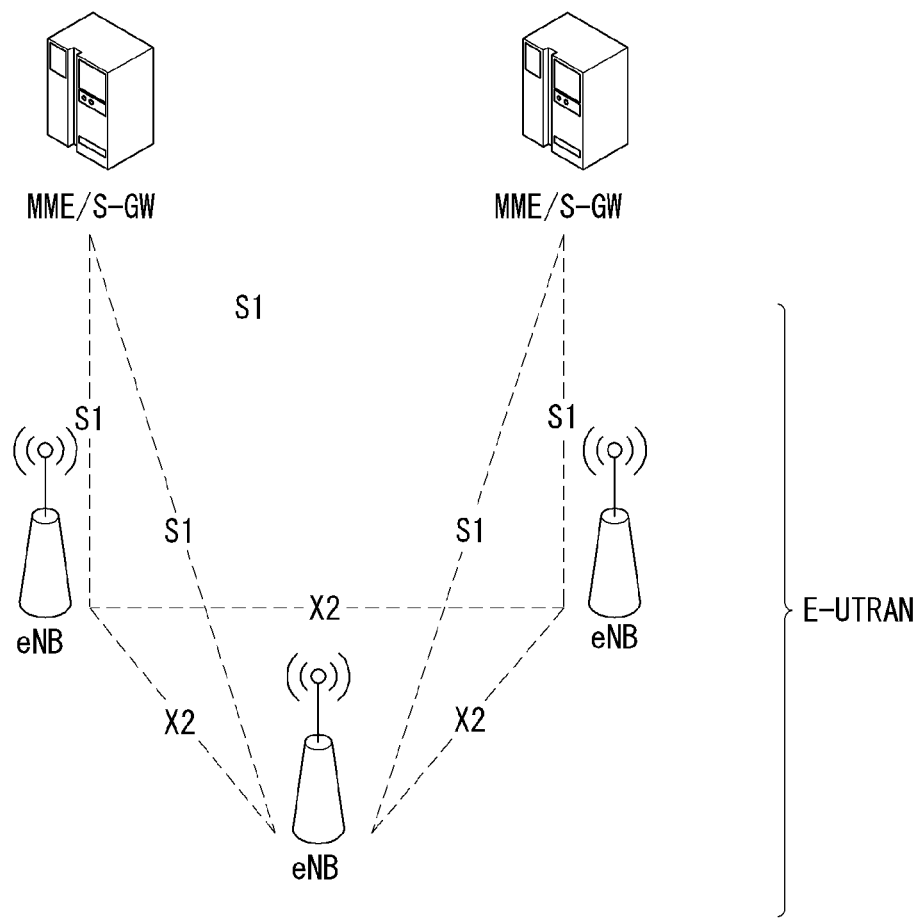
[FIG. 2]

[FIG. 3]
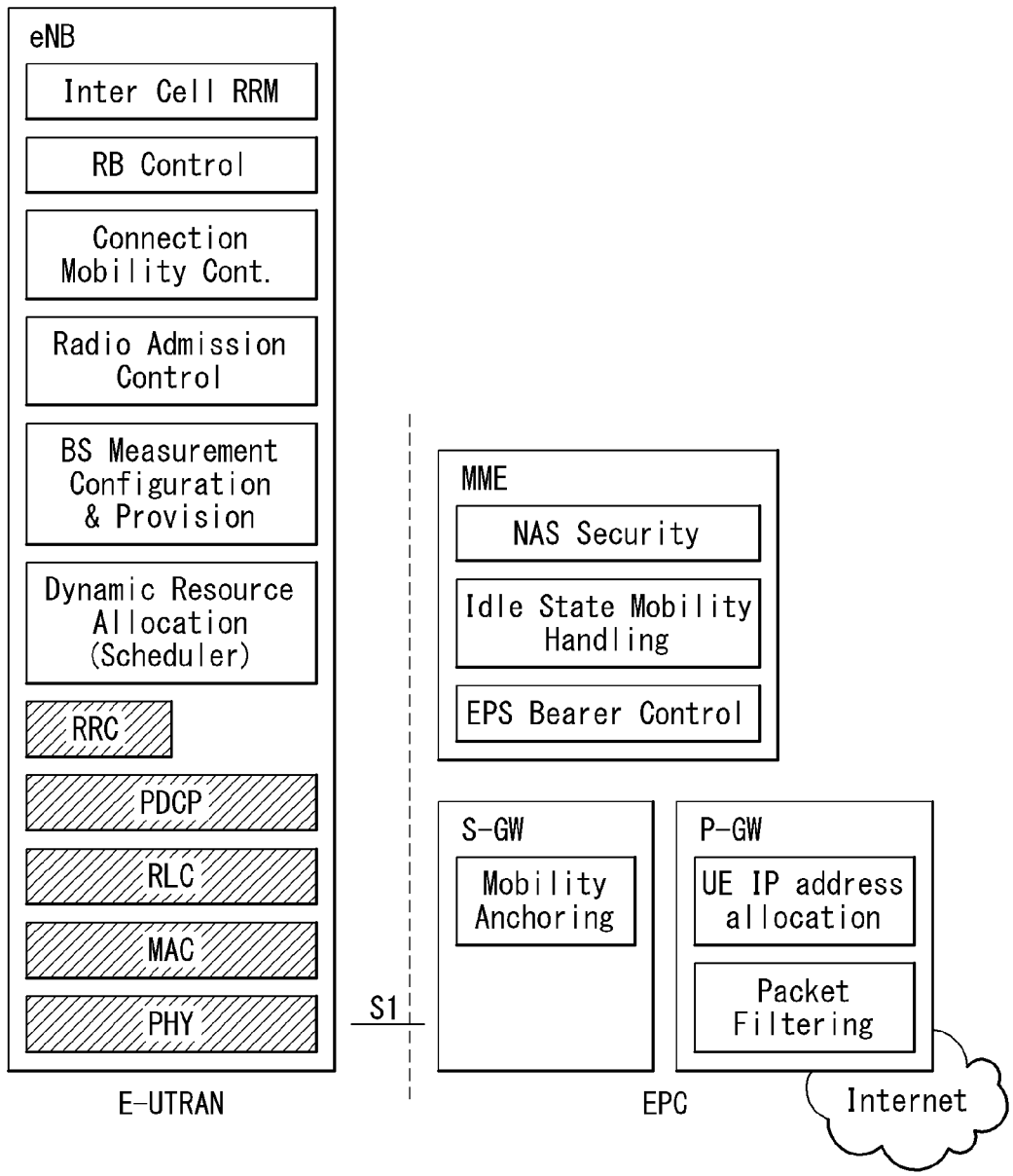

[FIG. 4]
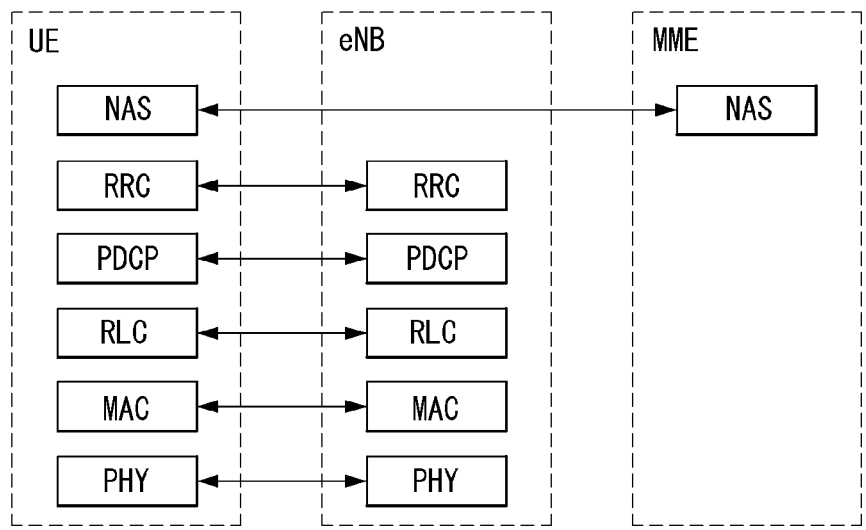
(a) Control Plane Protocol Stack
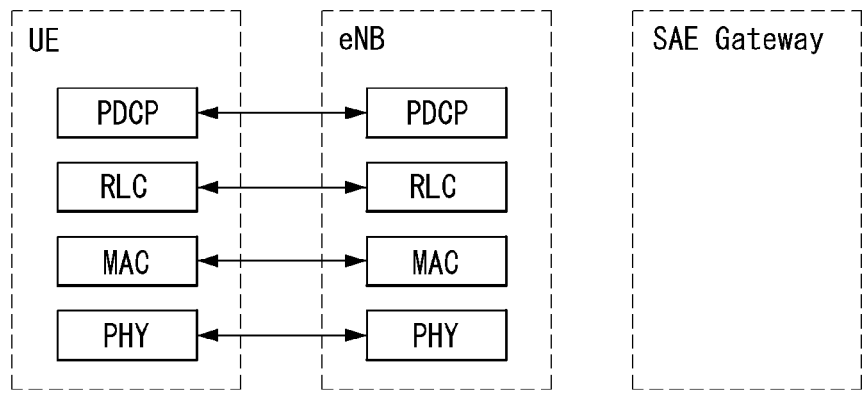
(b) User Plane Protocol Stack

[FIG. 5]
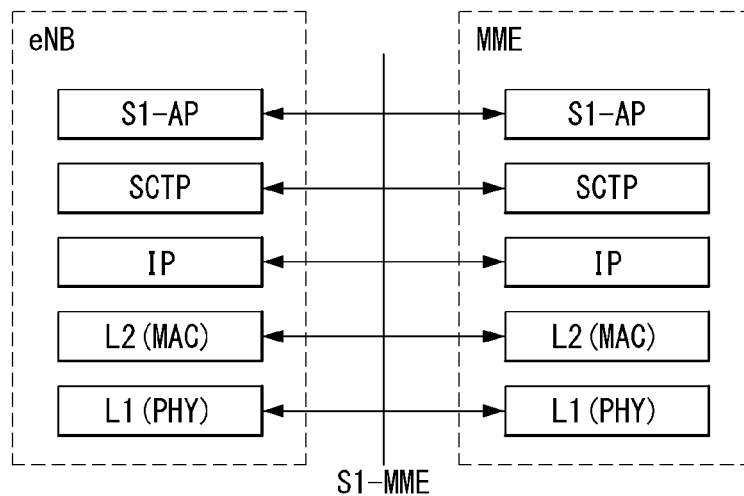
(a) control-plane protocol stack
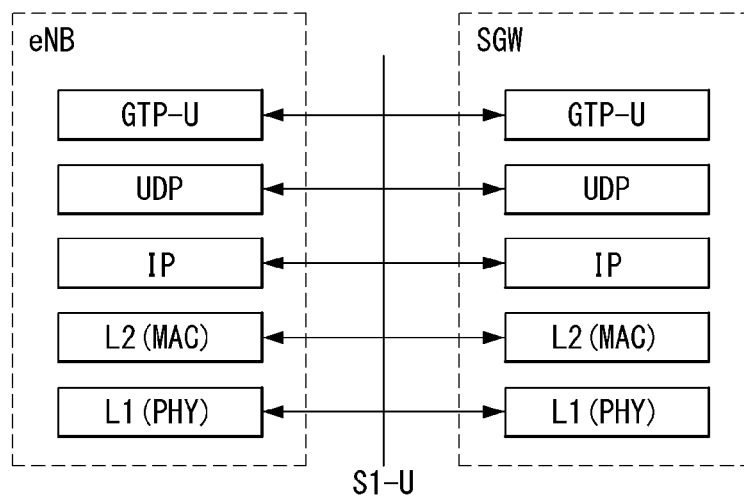
(b) user-plane protocol stack

[FIG. 6]
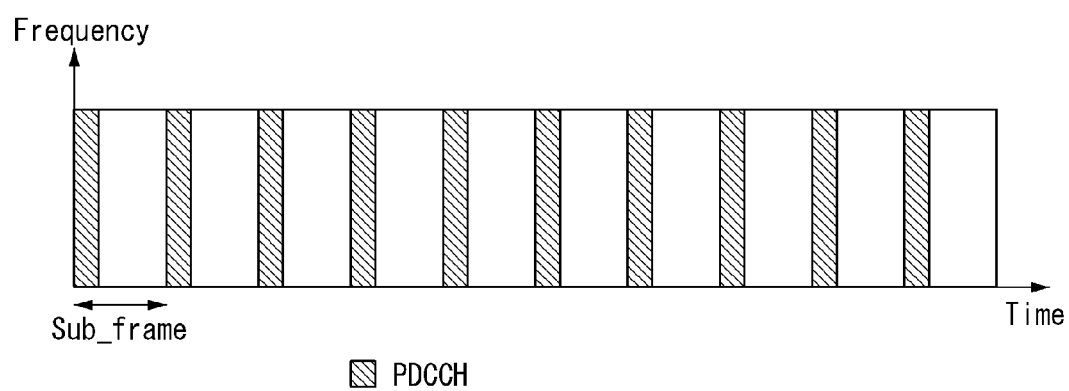

【FIG. 7】
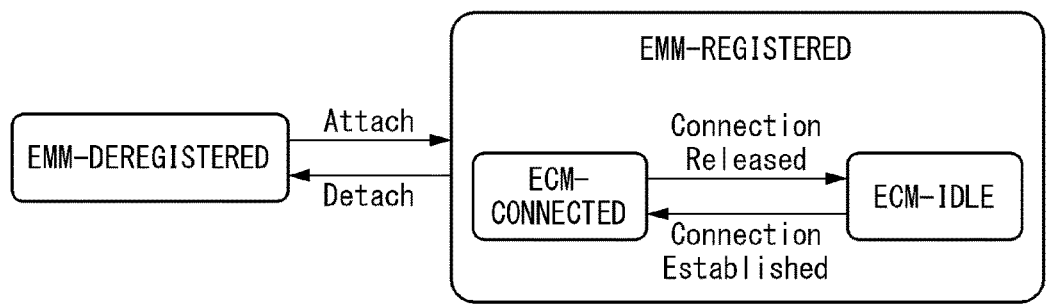

[FIG. 8]
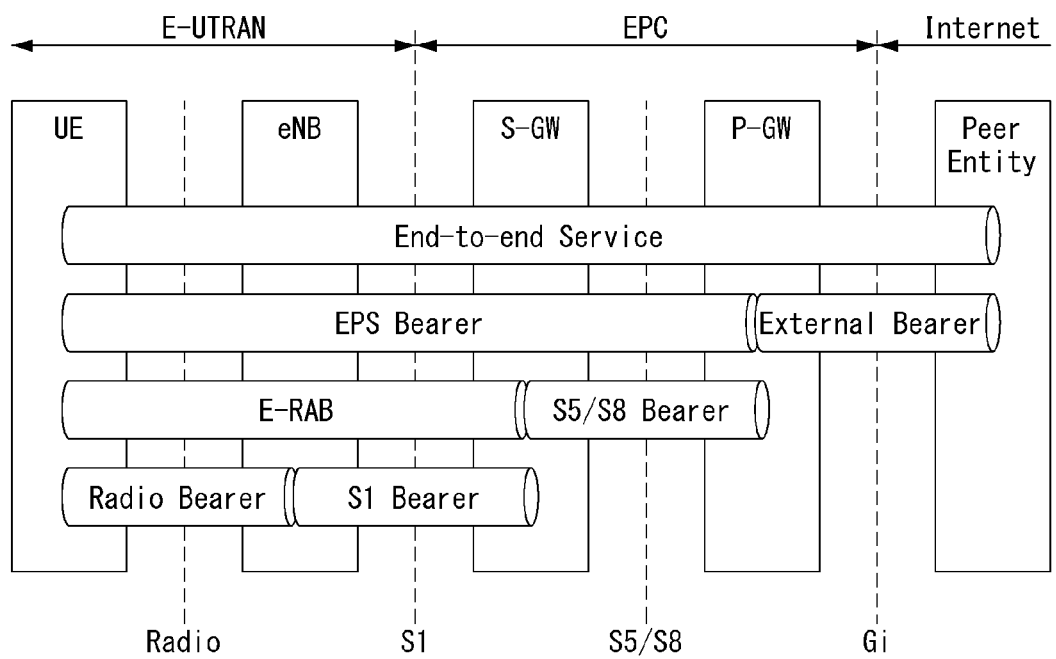

[FIG. 9]
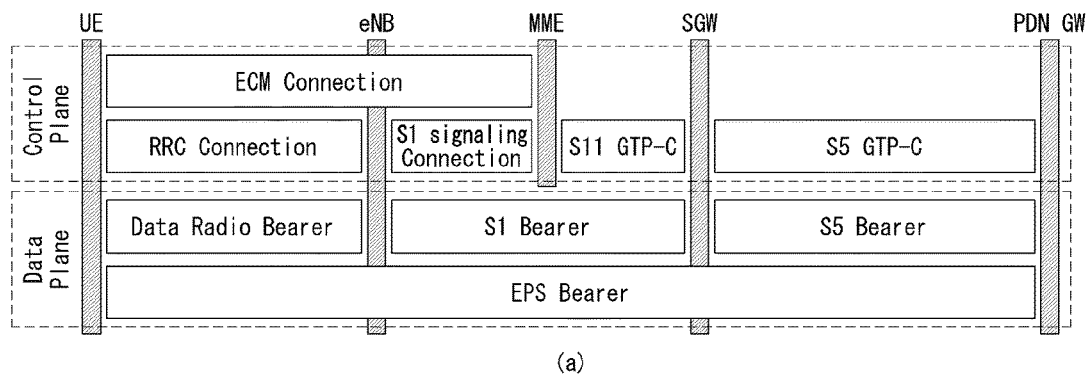
(a)
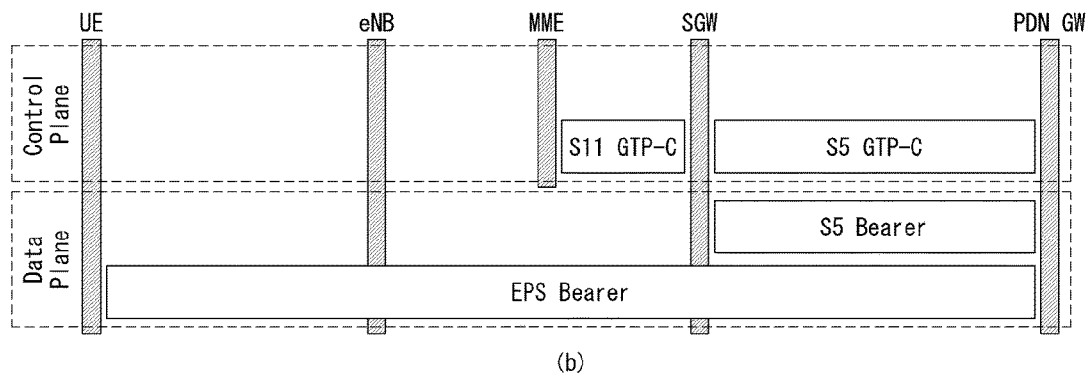
(b)

[FIG. 10]
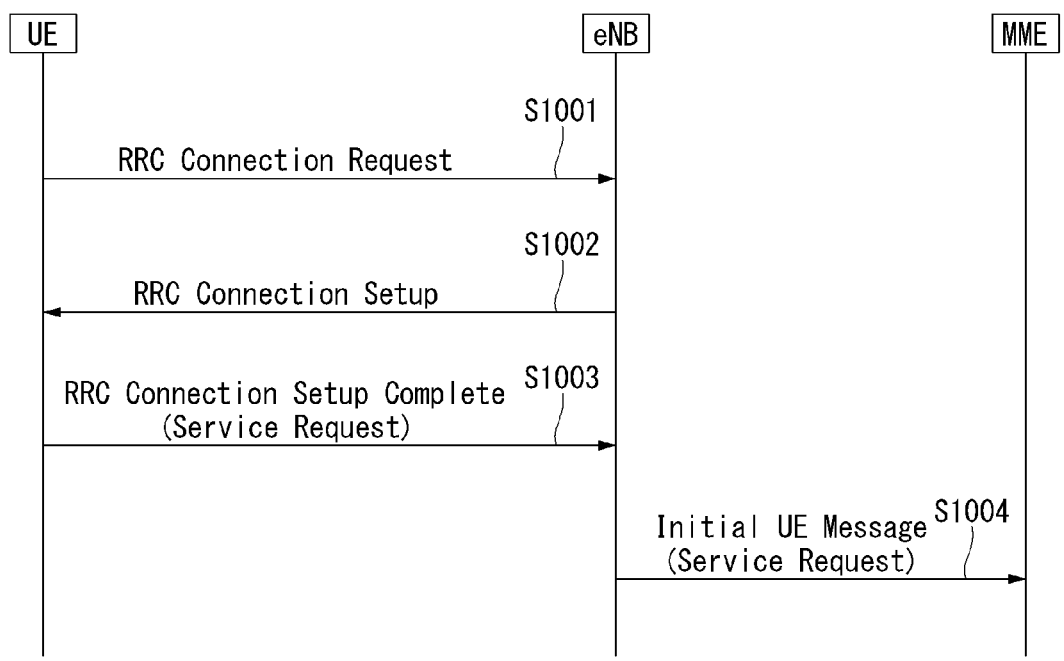

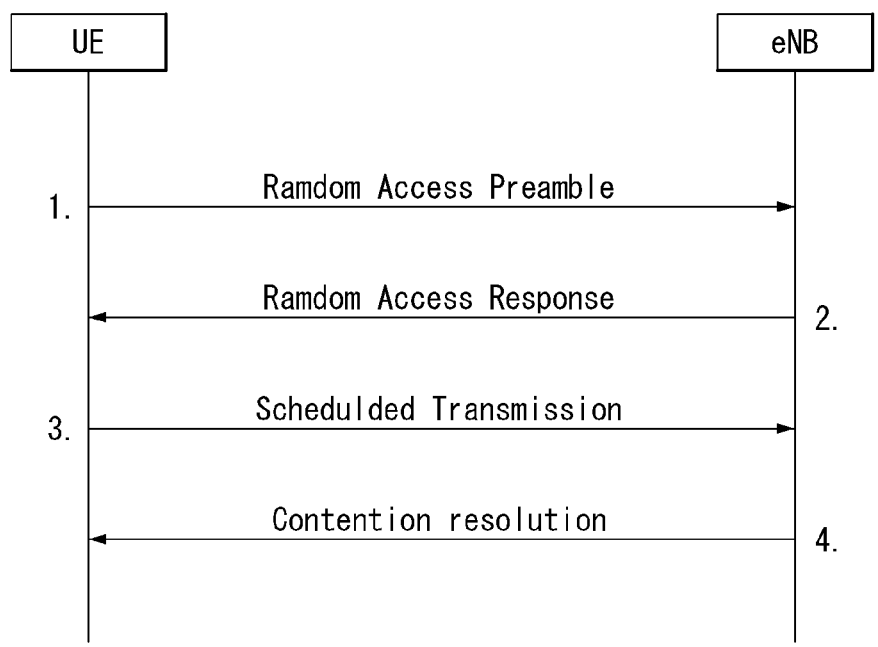
[FIG. 11]

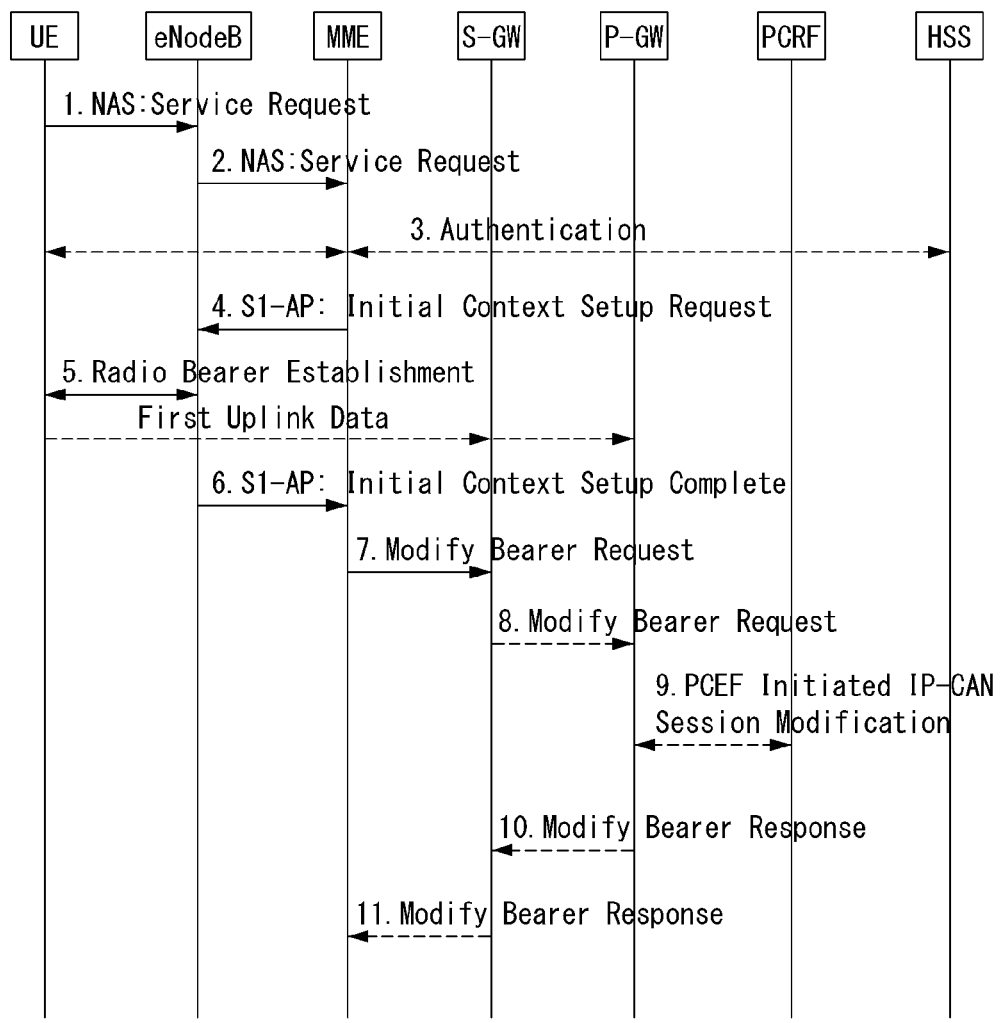
[FIG. 12]

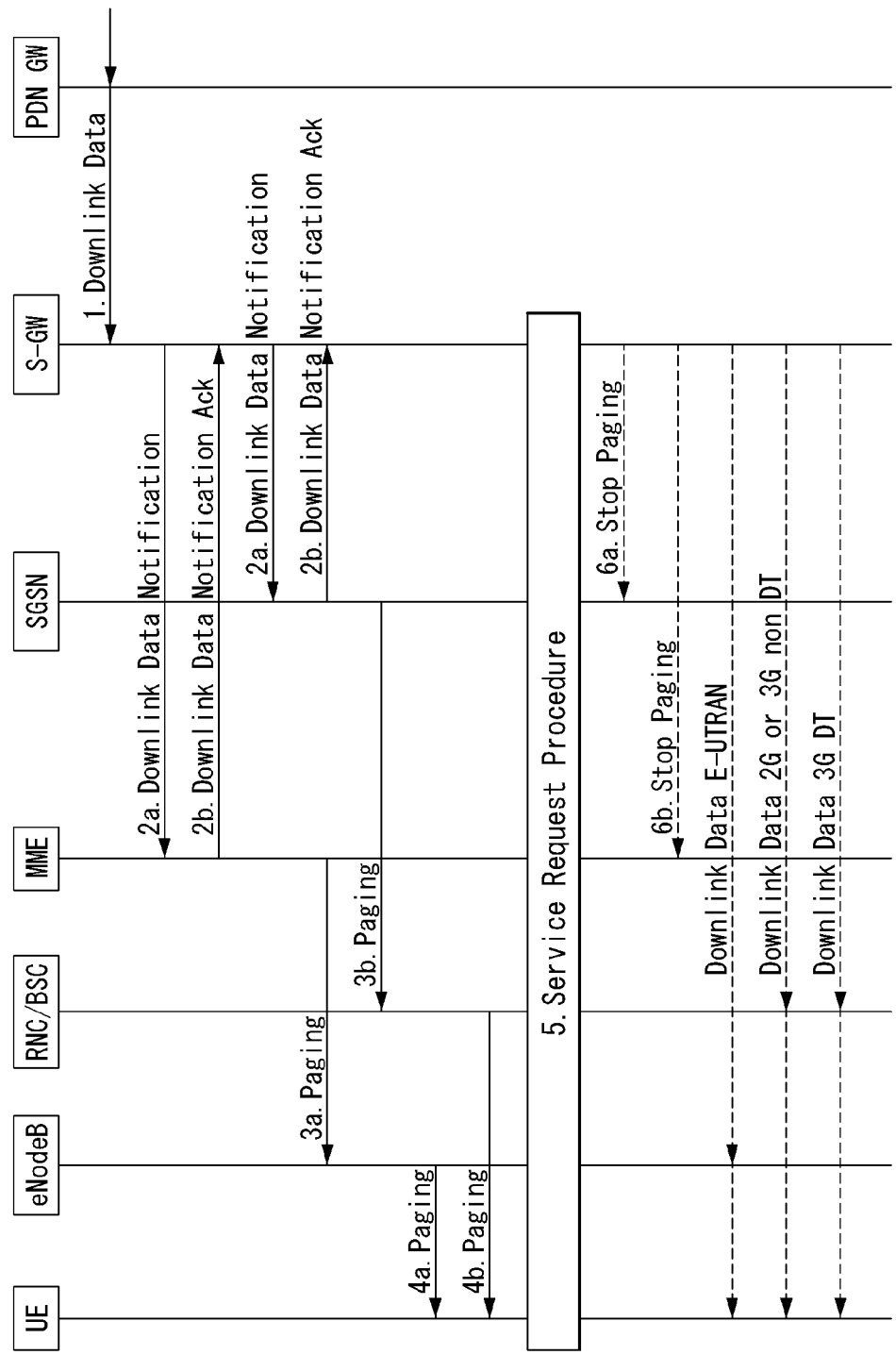
[FIG. 13]

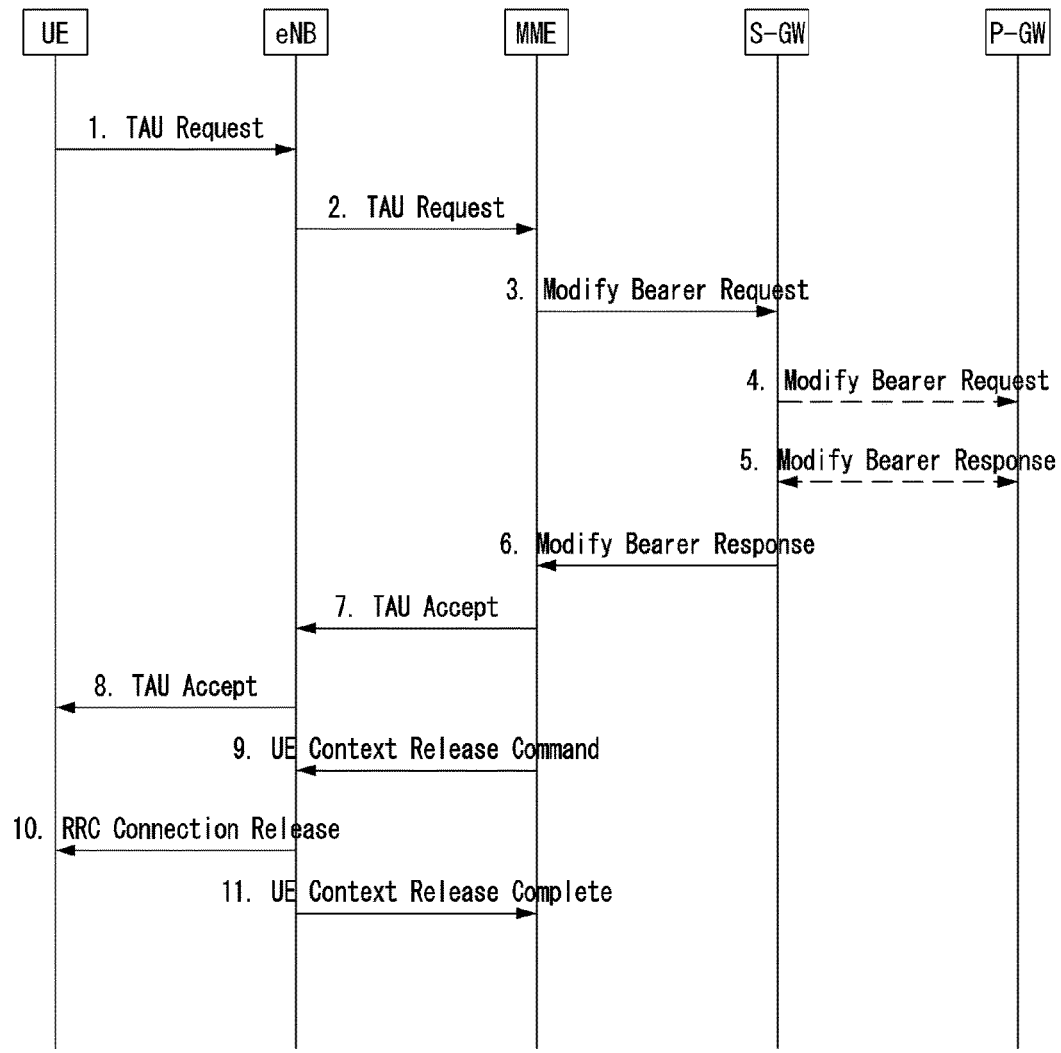
[FIG. 14]

[FIG. 15]
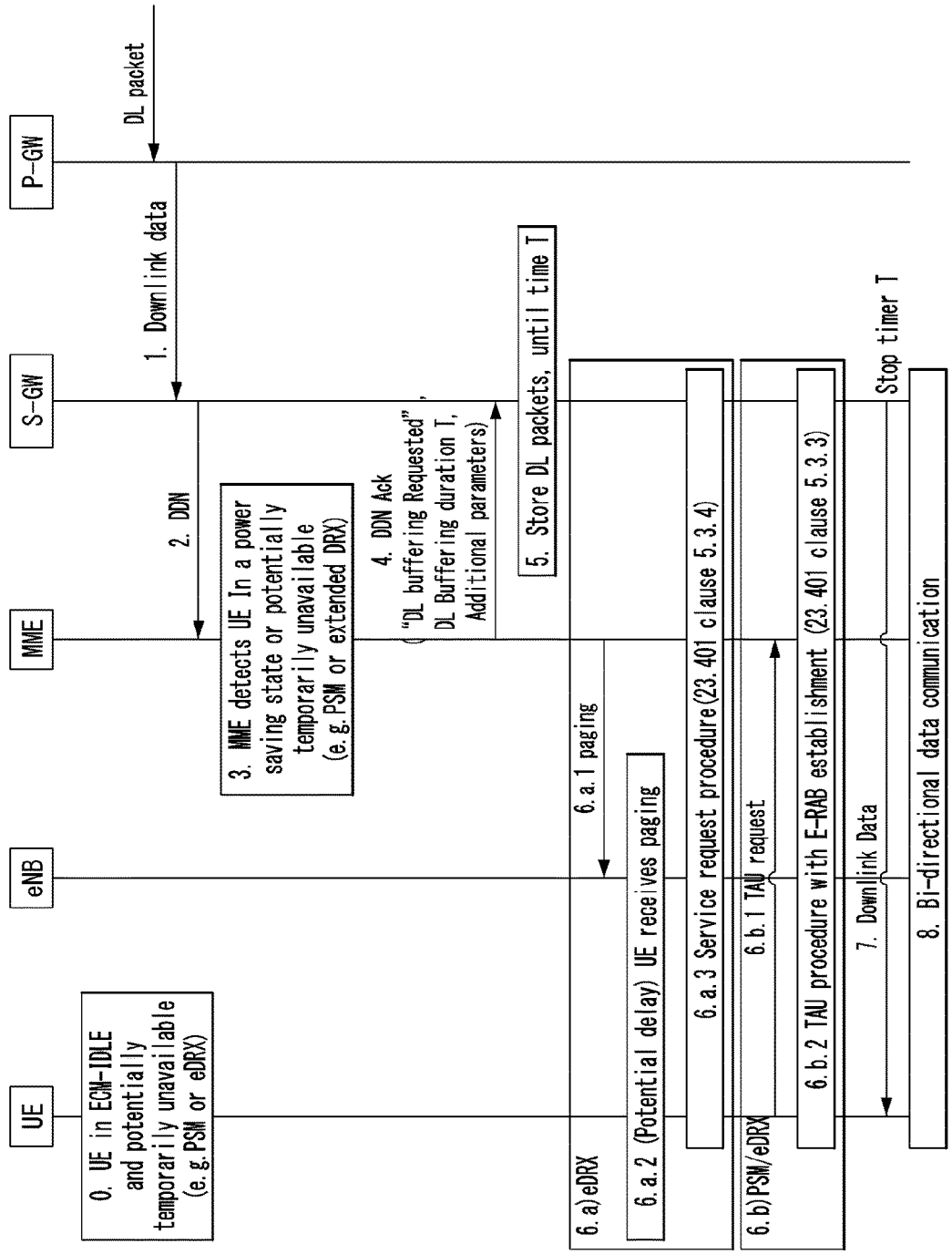

[FIG. 16]
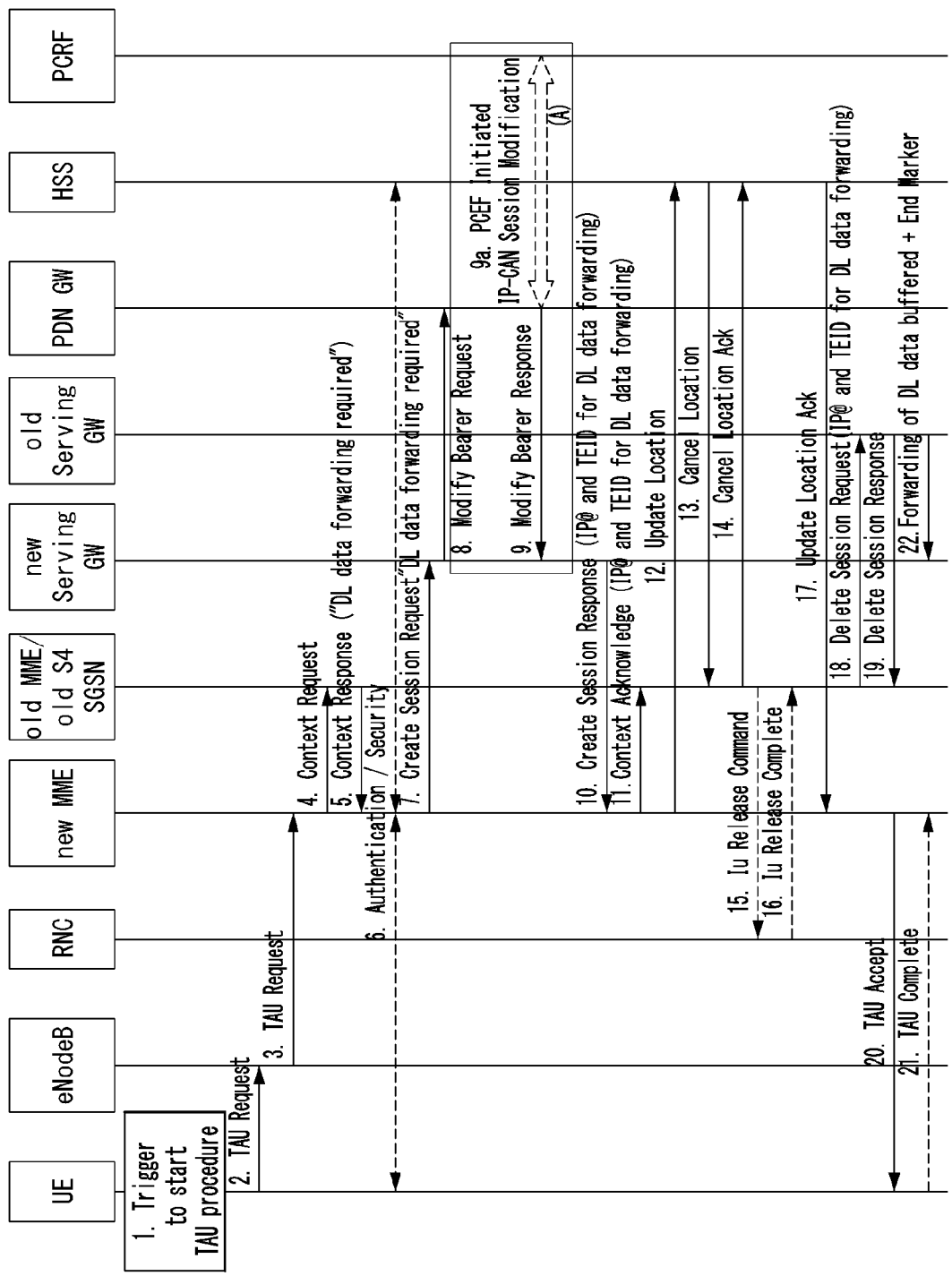

【FIG. 17】
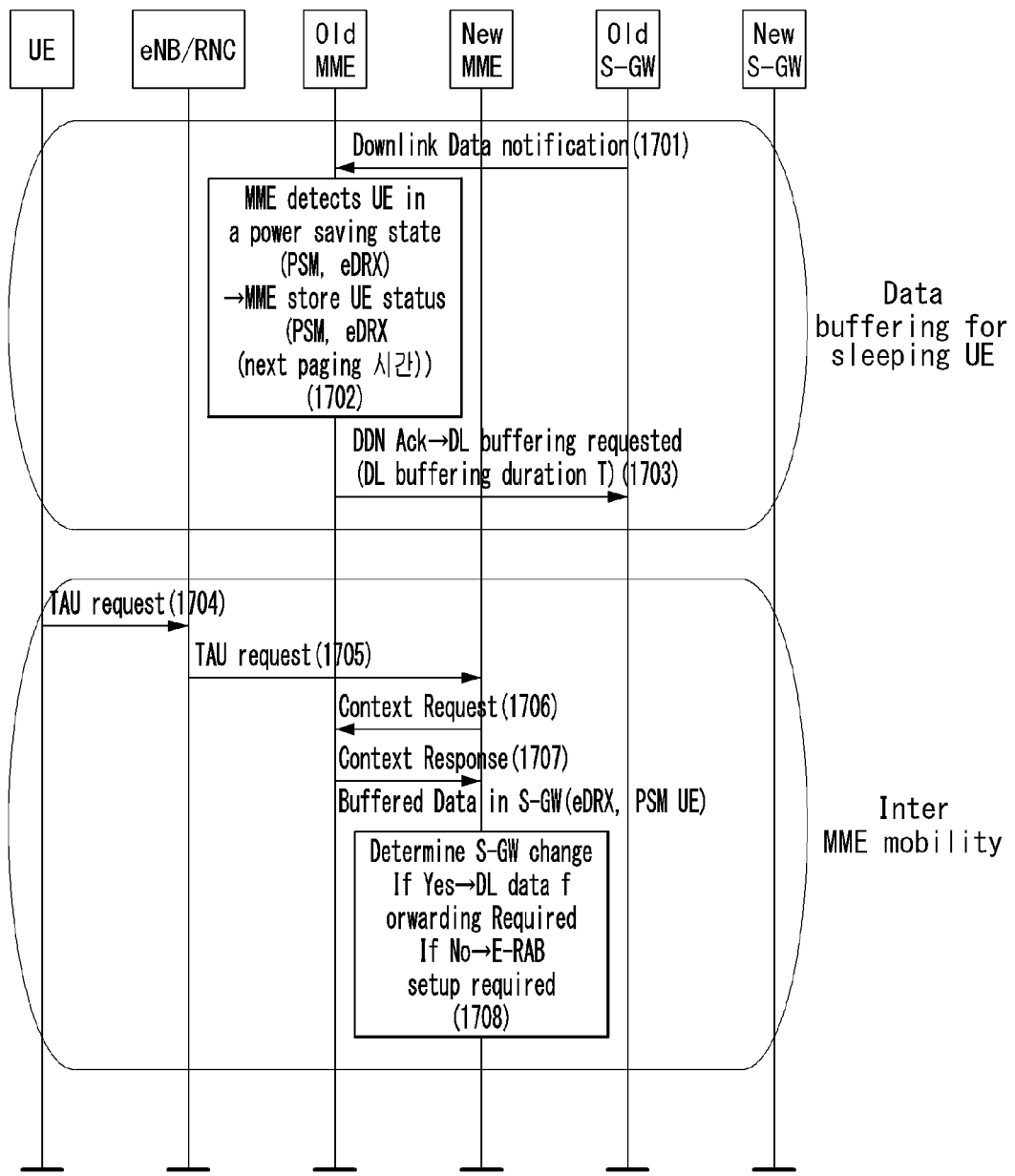

[FIG. 18]
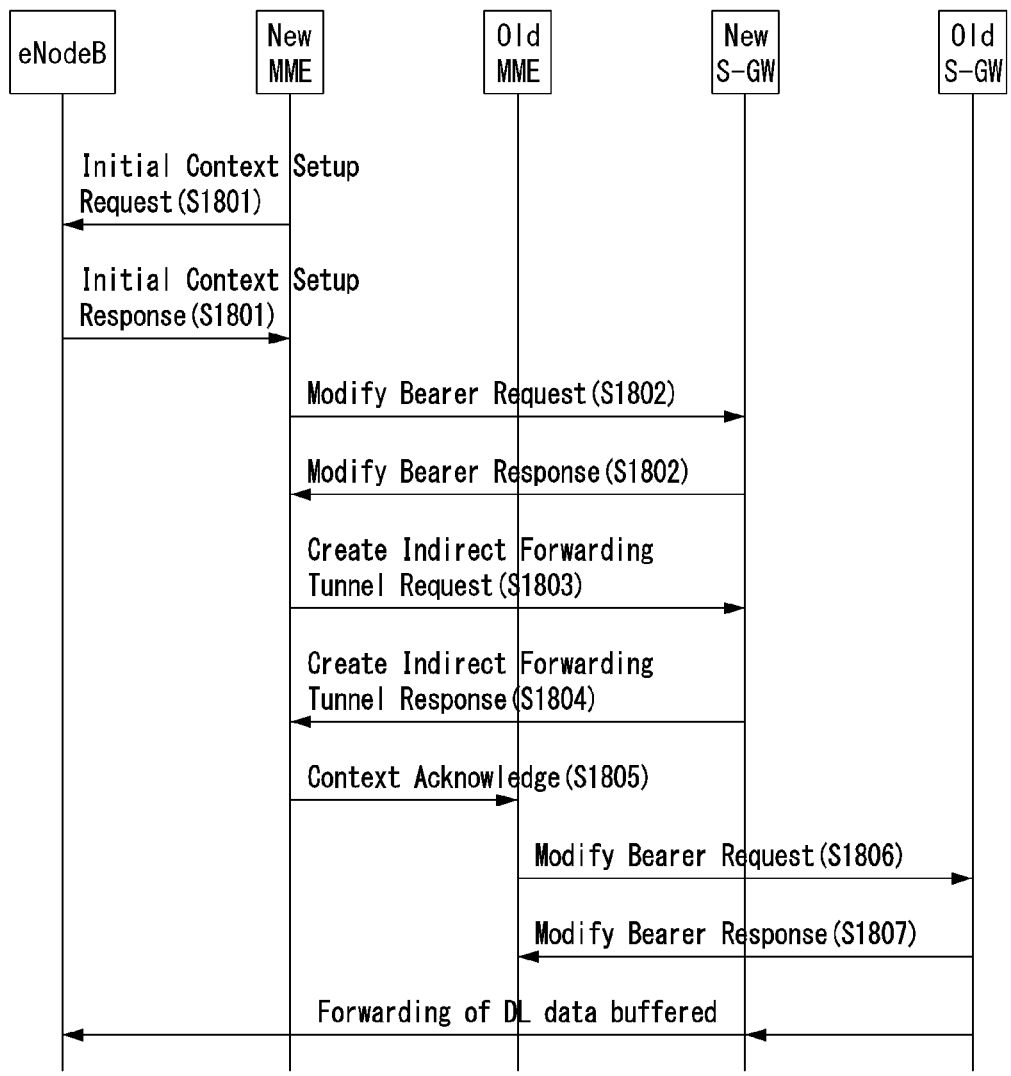

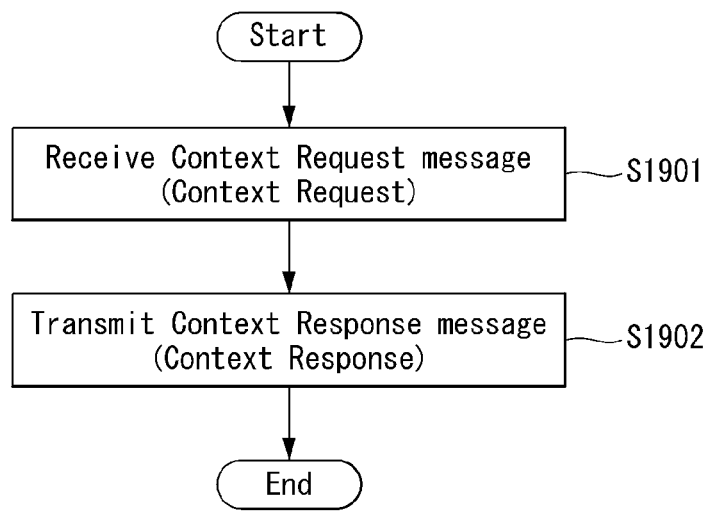
[FIG. 19]

[FIG. 20]
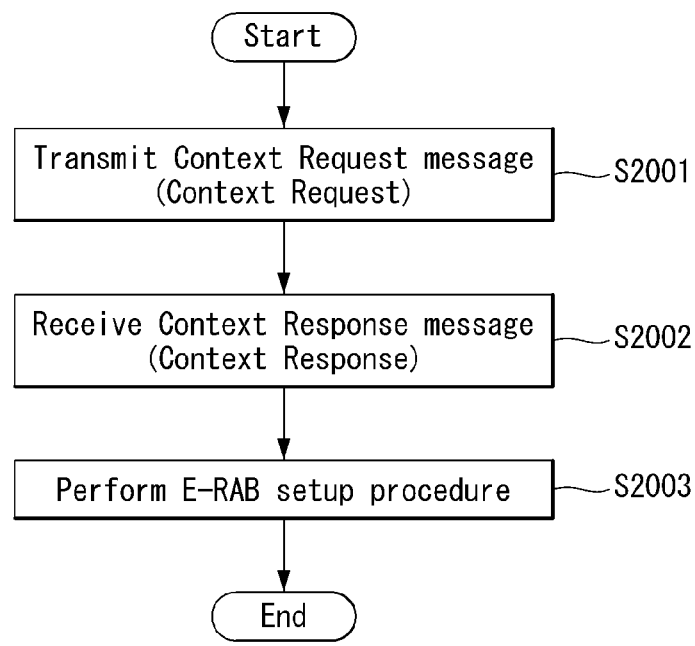

[FIG. 21]
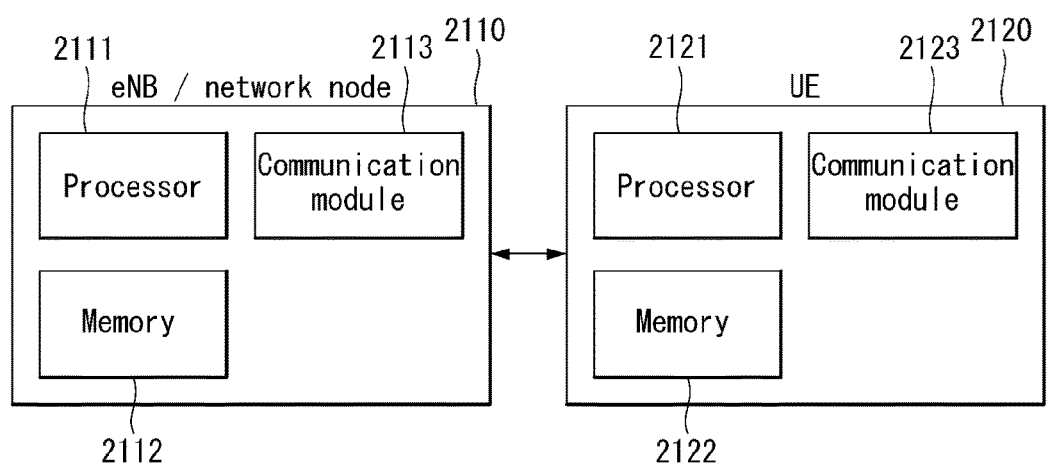

[FIG. 22]
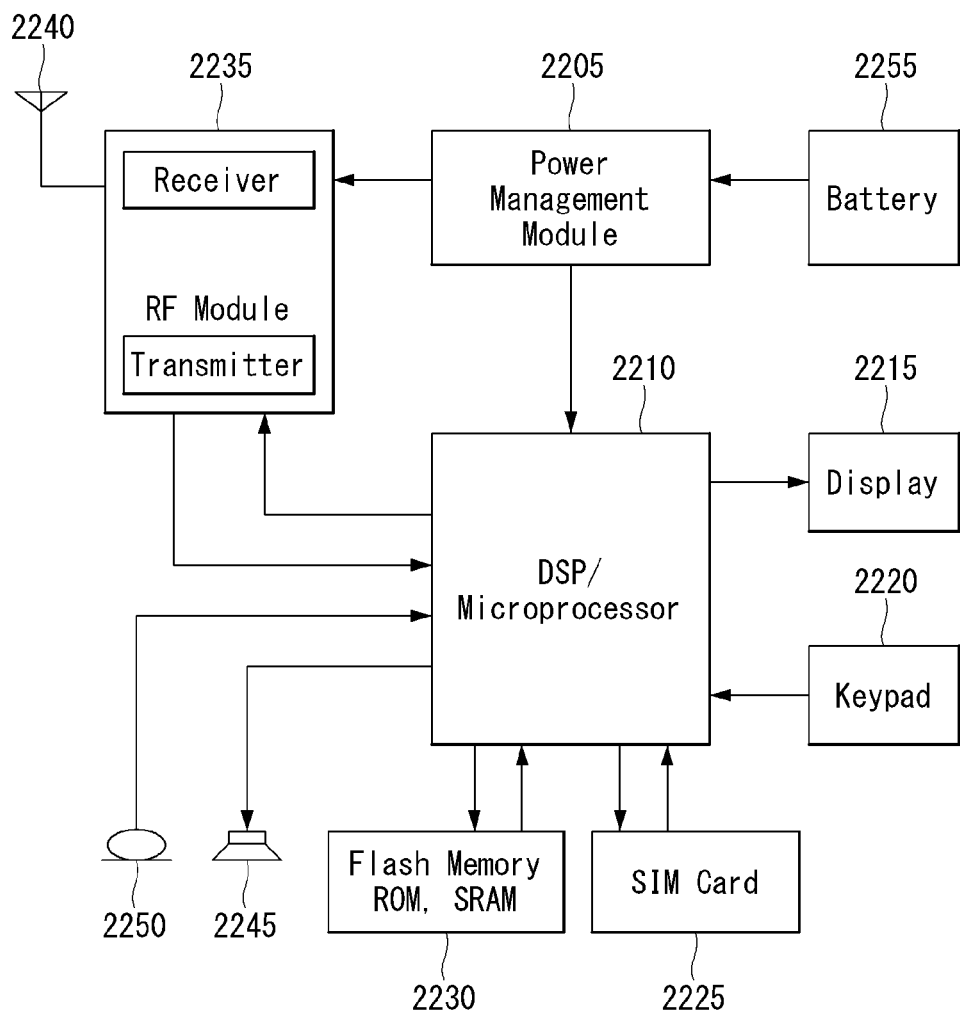

METHOD FOR UPDATING AREA IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2016/000413, filed on Jan. 14, 2016, which claims the benefit of U.S. Provisional Application No. 62/103,089, filed on Jan. 14, 2015, the contents of which are all hereby incorporated by reference herein in their entirety.

TECHNICAL FIELD

The present invention relates to wireless communications, and more particularly, to a method for performing a tracking/routing area update procedure of a user equipment and a device for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a tracking/routing area update procedure for a user equipment that applies the power saving function.

In addition, an object of the present invention is to propose a tracking/routing area update procedure with a change between mobile management entities and/or a change between serving gateways for a user equipment that applies the power saving function.

Technical objects of the present invention are not limited to the above-described object and other technical objects that have not been described above will become evident to those skilled in the art from the following description.

Technical Solution

According to an aspect of the present invention, a method for performing a Tracking Area Update (TAU) with a Mobility Management Entity (MME) change performed by a first MME in a wireless communication system may include receiving a Context Request message from a second MME during the TAU procedure and transmitting a Context Response message to the second MME in response to the Context Request message, wherein an indication that there are downlink data buffered in the S-GW may be included in the Context Response message when downlink data is buffered in a Serving Gateway (S-GW) and a buffering time of the downlink data in the S-GW is not expired.

According to another aspect of the present invention, a first Mobility Management Entity (MME) performing a Tracking Area Update (TAU) with an MME change in a wireless communication system may include a communication module for transmitting and receiving a signal, and a processor for controlling the communication module, wherein the processor is configured to perform: receiving a Context Request message from a second MME during the TAU procedure, and transmitting a Context Response message to the second MME in response to the Context Request message, wherein an indication that there are downlink data buffered in the S-GW may be included in the Context Response message when downlink data is buffered in a Serving Gateway (S-GW) and a buffering time of the downlink data in the S-GW is not expired.

Preferably, the indication that there are downlink data buffered in the S-GW may not be included in the Context Response message when the buffering time expires.

Preferably, the buffering time may be forwarded to the S-GW through a DDN Acknowledgment (DDN Ack) message, when it is detected that a user equipment is in a power saving state during a Network-triggered Service Request procedure.

Preferably, the buffering time may be stored in the first MME.

Preferably, the power saving state may be either one of a Power Saving Mode (PSM) or an extended Discontinuous Reception (eDRX) mode.

According to still another aspect of the present invention, a method for performing a Tracking Area Update (TAU) with a Mobility Management Entity (MME) change performed by a second MME in a wireless communication system may include transmitting a Context Request message to a first MME during the TAU procedure, receiving a Context Response message from the first MME in response to the Context Request message, and performing an E-UTRAN Radio Access Bearer setup procedure in order to forward the downlink data buffered in the S-GW without regard to whether a Downlink Data Notification (DDN) is received when receiving an indication that there are downlink data buffered in a Serving Gateway (S-GW) through the Context Response message.

According to still another aspect of the present invention, a second Mobility Management Entity (MME) performing a Tracking Area Update (TAU) with an MME change in a wireless communication system may include a communication module for transmitting and receiving a signal, and a processor for controlling the communication module, the processor is configured to perform: transmitting a Context Request message to a first MME during the TAU procedure, receiving a Context Response message from the first MME in response to the Context Request message, and performing an E-UTRAN Radio Access Bearer setup procedure in order to forward the downlink data buffered in the S-GW without regard to whether a Downlink Data Notification (DDN) is received when receiving an indication that there are downlink data buffered in a Serving Gateway (S-GW) through the Context Response message.

Preferably, an indication that there are downlink data buffered in the S-GW may be included in the Context Response message when downlink data is buffered in the S-GW and a buffering time of the downlink data in the S-GW is not expired.

Preferably, the indication that there are downlink data buffered in the S-GW may not be included in the Context Response message when the buffering time expires.

Technical Effects

According to an embodiment of the present invention, it may be smoothly proceeded a tracking/routing area update procedure for a user equipment that applies the power saving function.

In addition, according to an embodiment of the present invention, in the case of applying a downlink buffering mechanism in a serving gateway to a user equipment that applies the power saving function, the downlink data buffered in the serving gateway may be smoothly transferred to the user equipment in a tracking/routing area update procedure.

According to an embodiment of the present invention, by properly transferring downlink data to a user equipment that applies the power saving function in a tracking/routing area update procedure, unnecessary consumption of radio resource may be prevented, and unnecessary power consumption of a user equipment may be prevented.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates an Evolved Packet System (EPS) to which the present invention can be applied.

FIG. 2 illustrates an example of the network structure of E-UTRAN (evolved universal terrestrial radio access network) to which the present invention can be applied.

FIG. 3 illustrates architecture of an E-UTRAN and an EPC in a wireless communication system to which the present invention can be applied.

FIG. 4 illustrates a radio interface protocol structure between a UE and an E-UTRAN in a wireless communication system to which the present invention can be applied.

FIG. 5 illustrates an S1 interface protocol structure in a wireless communication system to which the present invention can be applied.

FIG. 6 is a schematic diagram illustrating a physical channel structure in a wireless communication system to which the present invention can be applied.

FIG. 7 illustrates an EMM and ECM states in a wireless communication system to which the present invention can be applied.

FIG. 8 illustrates a bearer structure in a wireless communication system to which the present invention can be applied.

FIG. 9 illustrates transmission paths of a control plane and a user plane in an EMM registration state in a wireless communication system to which the present invention can be applied.

FIG. 10 is a diagram illustrating an ECM connection establishment procedure in a wireless communication system to which the present invention can be applied.

FIG. 11 is a diagram for describing a contention-based random access procedure in a wireless communication system to which the present invention can be applied.

FIG. 12 illustrates a UE trigger Service Request procedure in a wireless communication system to which the present invention can be applied.

FIG. 13 is a diagram illustrating a network-triggered service request procedure in a wireless communication system to which the present invention can be applied.

FIG. 14 illustrates a periodic tracking area update procedure in a wireless communication system to which the present invention can be applied.

FIG. 15 is a diagram illustrating a DL data transmission procedure in a wireless communication system to which the present invention can be applied.

FIG. 16 illustrates a tracking area update procedure with S-GW change in a wireless communication system to which the present invention can be applied.

FIG. 17 is a diagram illustrating a tracking area update procedure according to an embodiment of the present invention.

FIG. 18 is a diagram illustrating a tracking area update procedure according to an embodiment of the present invention.

FIG. 19 is a diagram illustrating a method for performing a tracking area update according to an embodiment of the present invention.

FIG. 20 is a diagram illustrating a method for performing a tracking area update according to an embodiment of the present invention.

FIG. 21 illustrates a block diagram of a communication device according to one embodiment of the present invention.

FIG. 22 illustrates a block diagram of a communication device according to an embodiment of the present invention.

BEST MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI).

A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

In what follows, the present invention will be described based on the terms defined above.

Overview of System to which the Present Invention can be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates an example of the network structure of E-UTRAN (evolved universal terrestrial radio access network) to which the present invention can be applied.

An E-UTRAN system is an advanced version of the existing UTRAN system, and may be a 3GPP LTE/LTE-A system, for example. Communication network is widely disposed to provide various communication services like a voice service (e.g., Voice over Internet Protocol (VoIP)) through an IMS and packet data.

Referring to FIG. 2, an E-UMTS network includes an E-UTRAN, an EPC and at least one UE. The E-UTRAN includes eNBs that provide a control plane protocol and a user plane protocol to UEs, and the eNBs are connected via the X2 interface.

The X2 user plane interface X2-U is defined between the eNBs. The X2-U interface provides non-guaranteed delivery of user plane PDUs (packet data units). The X2 control plane interface X2-CP is defined between two neighbor eNBs. The X2-CP performs the following functions: context transfer between eNBs, control of user plane tunnels between a source eNB and a target eNB, transfer of handover-related messages, uplink load management, and the like.

An eNB is connected to user equipment UE through a radio interface and is connected to an Evolved Packet Core (EPC) through the S1 interface.

The S1 user plane interface (SI-U) is defined between the eNB and the serving gateway (S-GW). The SI control plane interface (S1-MME) is defined between the eNB and a Mobility Management Entity (MME). The S1 interface performs the following functions: Enhanced Packet System (EPS) Bearer Service Management function, Non-Access Stratum (NAS) Signaling Transport function, Network Sharing Function, MME Load balancing Function and the like. The S1 interface supports many-to-many relations between eNBs and MMEs/S-GWs.

An MME may perform various functions such as NAS signaling security, Access Stratum (AS) security control, Core Network (CN) Inter-node signaling for supporting mobility between 3GPP access networks, Tracking Area Identity (TAI) management (for idle and active modes UE), PDN GW and SGW selection, MME selection for the handover in which an MME is changed, SGSN selection for the handover to 2G or 3G 3GPP access network, roaming, authentication, bearer management function including dedicated bearer establishment, message transmission support in Public Warning System (PWS) (Earthquake and Tsunami Warning System; ETWS) and Commercial Mobile Alert System (CMAS), and the like.

FIG. 3 illustrates architecture of an E-UTRAN and an EPC in a wireless communication system to which the present invention can be applied.

Referring to FIG. 3, an eNB may perform functions of selection for gateway (e.g., MME), routing toward a gateway during a radio resource control (RRC) activation, scheduling and transmitting of broadcast channel (BCH) information, dynamic allocation of resources to UEs in uplink and downlink, and mobility control in LTE_ACTIVE state. As described above, a gateway in an EPC may perform functions of paging origination, LTE_IDLE state management, ciphering of the user plane, System Architecture Evolution (SAE) bearer control, and ciphering and integrity protection of NAS signaling.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PH ICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located higher the transport channels and are mapped to the transport channels. The logical channels may be divided into a control channel for transferring control area information and a traffic channel for transferring user area information. The logical channels include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), a Multicast Traffic Channel (MTCH), and the like. Traffic channels includes a dedicated traffic channel (DTCH), a multicast traffic channel (MTCH), and so on. The PCCH is a downlink channel for transferring paging information, and used when a network does not know the cell in which a UE is included. The CCCH is used by a UE that does not an RRC connection with a network. The MCCH is a point-to-multipoint downlink channel used for transferring Multimedia Broadcast and Multicast Service (MBMS) control information from a network to a UE. The DCCH is a point-to-point bi-directional channel used by a UE that has an RRC connection transferring dedicated control information between a UE and a network. The DTCH is a point-to-point channel dedicated to a single UE for transferring user information that may be existed in uplink and downlink. The MTCH is a point-to-multipoint downlink channel for transferring traffic data from a network to a UE.

In the case of an uplink connection between a logical channel and a transport channel, the DCCH may be mapped to a UL-SCH, the DTCH may be mapped to a UL-SCH and the CCCH may be mapped to a UL-SCH. In the case of a downlink connection between a logical channel and a transport channel, the BCCH may be mapped to a BCH or a DL-SCH, the PCCH may be mapped to a PCH, the DCCH may be mapped to a DL-SCH, the DTCH may be mapped to a DL-SCH, the MCCH may be mapped to an MCH and the MTCH may be mapped to an MCH.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME.

Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 is a schematic diagram illustrating a physical channel structure in a wireless communication system to which the present invention can be applied.

Referring to FIG. 6 a physical channel transfers signaling and data through a radio resource that includes one or more subcarriers in a frequency domain and one or more symbols in a time domain.

A single subframe that has a length of 1.0 ms includes a plurality of symbols. A specific symbol(s) of a subframe (e.g., the first symbol of a subframe) may be used for a PDCCH. A PDCCH carries information of a resource dynamically allocated (e.g., resource block), a modulation and coding scheme (MCS), and so on.

EMM and ECM State

In what follows, EPS Mobility Management (EMM) and EPS Connection Management (ECM) states will be described.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the position of the UE differs from the position recognized by the network while the UE is in the ECM-IDLE state, the UE can inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

EPS Bearer

FIG. 8 illustrates a bearer structure in a wireless communication system to which the present invention can be applied.

When the UE is connected to a Packet Data Network (PDN) (which is the peer entity of FIG. 6), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 9 illustrates transmission paths of a control plane and a user plane in an EMM registration state in a wireless communication system to which the present invention can be applied.

FIG. 9(a) illustrates ECM-CONNECTED state, and FIG. 9(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 9(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 9(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

FIG. 10 is a diagram illustrating an ECM connection establishment procedure in a wireless communication system to which the present invention can be applied.

Referring to FIG. 10, a UE transmits an RRC Connection Request message to an eNB in order to request an RRC connection (step, S1001).

The RRC Connection Request message includes a UE Identity (e.g., SAE temporary mobile subscriber identity (S-TMSI)) or a random ID and an establishment cause.

The establishment cause is determined according to a NAS procedure (e.g., attach, detach, tracking area update, service request and extended service request).

The eNB transmits an RRC Connection Setup message in response to the RRC Connection Request message to the UE (step, S1002).

After receiving the RRC Connection Setup message, the UE is shifted to an RRC_CONNECTED mode.

In order to check a successful completion of the RRC connection establishment, the UE transmits an RRC Connection Setup complete message to the eNB (step, S1003).

The UE transmits the RRC Connection Setup complete message with NAS messages (e.g., initial attach message, service request message, etc.) being included to the eNB.

The eNB obtains the service request message from the RRC Connection Setup complete message, and forwards it to an MME through an initial UE message which is an S1AP message (step, S1004).

The control signal between the eNB and the MME is forwarded through an S1AP message in an S1-MME interface. The S1AP message is transferred through an S1 signaling connection for each user, and the S1 signaling connection is defined by an identifier pair (i.e., eNB UE S1AP ID and MME UE S1AP ID) that the eNB and the MME allocate in order to identify the UE.

The eNB allocates the eNB UE S1AP ID and transmits it with being included in the initial UE message. And the MME receives the initial UE message and allocates the MME S1AP UE ID, and setup an S1 signaling connection between the eNB and the MME.

Random Access Procedure

Hereinafter, a random access procedure which is provided in a LTE/LTE-A system will be described.

The random access procedure is used in order for a UE to obtain the UL synchronization with an eNB or to be allocated with UL radio resource. After turning on the power of UE, the UE acquires the DL synchronization with an initial cell and receives the system information. The UE gains the information of the set of usable random access preamble and that of the radio resource which is used for the transmission of random access preamble. The radio resource that is used for the transmission of random access preamble may be specified as the combination of at least one subframe index and an index on the frequency domain. The UE transmits the random access preamble that is randomly selected from the set of random access preamble, and the eNB that receives the random access preamble transmits the timing alignment (TA) value for the UL synchronization to the UE through the random access response. The UE acquires the UL synchronization in this way.

The random access procedure shows common in frequency division duplex (FDD) and time division duplex (TDD). The random access procedure is irrelevant to the cell size, and the number of serving cell in case of the carrier aggregation being configured.

First, the following shows the case that a UE performs the random access procedure.

- In case that the UE performs an initial access in a RRC idle state without any RRC connection to an eNB
- In case that the UE performs a RRC connection re-establishment procedure
- In case that the UE tries to an initial access to a target cell in a handover procedure
- In case that an random access procedure is requested by the order from eNB
- In case that there is any data that is going to be transmitted to UL in a non-synchronized condition during the RRC connected state
- In case that there is any data that is going to be transmitted to UL in a non-synchronized condition and in a condition that the radio resource designated for requesting the radio resource is not allocated during the RRC connected state In case that the UE positioning is performed in a condition that timing advance is required during the RRC connected state In case that restoration procedure is performed in a radio link failure or handover failure In 3GPP Rel-10, it is considered that the timing advance (TA) value that is applicable to a specific cell (for example, PCell) in a wireless access system that supports the carrier aggregation is applied to a plurality of cells in common. However, the UE may aggregate a plurality of cells that are included in different frequency bands (that is, spaced apart on the frequency domain) or a plurality of cells that have different propagation characteristics. In addition, in case of a specific cell, for the extension of coverage or the removal of coverage hole, in a condition that small cells such as a remote radio header (RRH) (that is, repeater), a femto cell, or a pico cell, etc. or a secondary eNB (SeNB) is arranged in the cell, the UE performs a communication with the eNB (that is, macro eNB), in case of performing the communication with the secondary eNB through another cell, a plurality of cell may have different characteristics of the propagation delay. In this case, if the UL transmission is performed in a way that one TA value is commonly applied to a plurality of cells, it may profoundly affect the synchronization of UL signals that are transmitted on a plurality of cells. Accordingly, it may be desired to have a plurality of TAs in a condition of the CA that a plurality of cells are aggregated, and in 3GPP Rel-11, considered to allocate the TA independently in a specific cell group unit for supporting multiple TA. It is referred to as TA group (TAG), the TAG may include one or more cell(s), and the same TA may be commonly applied in one more cell(s) that are included in the TAG. For supporting the multiple TA, the MAC TA command control element is configured with 2-bit TAG ID and 6-bit TAG command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the relevant sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the relevant sTAG by the UE. Like this, the random access procedure may be performed in SCell as well in order to acquire timing alignment of the sTAG to which the relevant SCell belongs.

The LTE/LTE-A system provides both of the contention-based random access procedure that the UE randomly selects to use one preamble in a specific set and the non-contention-based random access procedure that the eNB uses the random access preamble that is allocated to a specific UE. However, the non-contention-based random access procedure, the handover procedure previously described, may be used only for the UE positioning and/or the timing advance alignment for the sTAG in case of being requested by the order of eNB. After the random access procedure is completed, a normal UL/DL transmission is made.

In the meantime, relay node (RN) also supports both of the contention-based random access procedure and the non-contention-based random access procedure. When the relay node performs the random access procedure, the RN suspends the subframe configuration at the moment. That is, it means that the RN subframe configuration is temporarily terminated. But, the RN subframe configuration is initiated at the time when the random access procedure has been successfully completed.

FIG. 11 is a diagram for describing a contention-based random access procedure in a wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The random access preamble is transmitted by 6 bits in the RACH transmission channel, and the 6-bit consists of 5-bit random identity for identifying the RACH transmitted UE and the rest 1-bit (e.g., indicating the size of Msg 3) for representing additional information.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the relevant UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary C-RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH. It is desirable to include the information of UE that is to receive the PDSCH, frequency and the time information of the PDSCH radio resource, and transmission type of the PDSCH etc in the PDCCH. As described above, if succeeding in detecting the PDCCH that is transmitted to the UE itself, the UE may receive properly the random access response that is transmitted to the PDSCH according to the PDCCH information.

The random access response window represents the maximum time section when the UE that transmits the preamble is waiting for the random access response message. The random access response window has the length of 'ra-ResponseWindowSize', which starts from the subframe after 3 subframes from the last subframe in which the preamble is transmitted. That is, the UE is waiting for receiving the random access response during the random access window secured after 3 subframes from the subframe in which the preamble transmission is completed. The UE may acquire the random access window size ('ra-ResponseWindowsize') parameter value through the system information, and the random access window size may be determined as a value from 2 to 10.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

As described above, the reason why the random access preamble index is needed in the random access response is that one random access response may include the random access response information for one or more UEs, and so there is required an index to instruct for which UE the above UL grant, TC-RNTI, and TAC are available.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB. In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. In the content based random access procedure, the eNB may not identify which UEs perform the random access procedure, but the eNB is required to identify the UE in order to solve the collision later on.

There are two ways how to include the identifier of UE. The first method is that the UE transmits the cell identifier of its own through the UL transmission signal corresponding to the UL grant, if the UE has a valid C-RNTI that is already allocated by the relevant cell before the random access procedure. Meanwhile, in the case that the UE has not been allocated a valid C-RNTI before the random access procedure, the UE transmits including unique identifier of its own (for example, S-TMSI or random number). Normally the above unique identifier is longer that C-RNTI.

For the transmission on the UL-SCH, the UE-specific scrambling is used. However, in the case that the UE has not been allocated C-RNTI yet, the scrambling is not based on the C-RNTI but uses TC-RNTI that is received from the random access response instead. In the case of transmitting the data corresponding to the UL grant, the UE renews a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSi or random number) through the message 3 from the UE, the eNB transmits the 4 message to the UE by using the TC-RNTI that is allocated from the random access response to the relevant UE. Herein, the 4 message may correspond to the RRC connection setup message including C-RNTI.

The UE waits for the instruction of eNB in order to solve the collision after transmitting the data including the identifier of its own through the UL grant included the random access response. That is, the UE attempts the receipt of PDCCH in order to a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE judges that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure judging that a normal procedure has been performed. The UE acquires C-RNTI through the 4 message, and after that, the UE and network are to transmit and receive a UE-specific (dedicated) message by using the C-RNTI.

The following is a description of the way how to solve a collision in the random access.

The reason why a collision is occurred in performing the random access is that the number of random access preamble is limited basically. That is, it is not available that the eNB assigns a unique random access preamble for the UE to all the UEs, and the UE should randomly select one among the common random access preambles and transmit. According to this, a case is occurred that two or more UEs select the identical random access preamble through the identical radio resource (PRACH resource) and transmit, but the eNB recognizes it as one random access preamble that is transmitted from one UE. Accordingly, the eNB transmits the random access response to the UE and the random access response is supposed to be received by one UE. However, as described above, as there is a possibility that a collision is occurred, two or more UEs are going to receive one random access response, and according to this, each UE performs an operation by the receipt of random access response. That is, there is a problem that two or more UEs transmit different data to the same radio resource by using one UL grant included in the random access response. According to this, the data transmission might be all failed, and depending on the location of UEs or transmission power, the data of a specific UE only may be received by the eNB. In the latter case, as all of the two or more UEs assume that the data transmission of its own are succeeded, the eNB should inform the fact to the relevant UEs that they are failed in contention. That is, what to inform the fact of the failure or success in contention is referred to as contention resolution.

There are two ways of contention resolution. The one is to use the contention resolution timer, and the other is to transmit the identifier of successful UE to UEs. The former is applied to the case that the UE already has a unique C-RNTI before the random access procedure. That is, the UE that already has the C-RNTI transmits the data including the C-RNTI of itself according to the random access response and operates the contention resolution timer. And if the PDCCH information that is addressed by the C-RNTI of its own is received before the contention resolution timer is terminated, the UE judges itself to succeed in the contention and normally terminates the random access. In the contrary, if the PDCCH information that is addressed by the C-RNTI of its own is not received before the contention resolution timer is terminated, the UE judges itself to fail in the contention and renews the random access procedure, or informs the fact of failure to the higher layer. In the latter case of the ways of contention resolution, that is, the case that is to transmit the identifier of successful UE, is used for what the UE does not have a unique C-RNTI before the random access procedure. That is, in case that the UE itself does not have C-RNTI, the UE transmits including a higher identifier (S-TMSI or random number) more than the C-RNTI of data according to the UL Grant information included in the random access response, and operates the contention resolution timer. In case that the data including the higher identifier of its own is transmitted to DL-SCH before the contention resolution timer is terminated, the UE judges that the random access procedure is successful. On the other hand, in case that the data including the higher identifier of its own is not transmitted to DL-SCH before the contention resolution timer is terminated, the UE judges that the random access procedure is failed.

Meanwhile, the operation of the non-contention-based random access procedure, unlike the contention-based random access procedure illustrated in FIG. 8, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Service Request Procedure

Generally, a UE-triggered service request procedure is performed when trying to start a new service by initiated by UE.

FIG. 12 illustrates a UE trigger Service Request procedure in a wireless communication system to which the present invention can be applied.

1-2. A UE initiates a UE-triggered Service Request procedure by transmitting a Service Request message to an MME.

The Service Request message is delivered being included in an RRC connection setup complete message through the RRC connection and delivered being included in an initial UE message through the S1 signaling connection.

3. For authentication of the UE, the MME requests and receives information for the authentication from an HSS, and performs mutual authentication with the UE.

4. The MME transmits an Initial Context Setup Request message to the eNB so that the eNB may configure an S1 bearer with an S-GW and configure a DRB with the UE.

5. An eNB transmits an RRC Connection Reconfiguration message to the UE to generate the DRB.

When this procedure is done, the generation of DRB is completed between the eNB and the UE, and all of uplink EPS bearers ranging from the UE to a P-GW are configured. The UE may transmit uplink traffic data to the P-GW.

6. The eNB transmits an Initial Context Setup Complete message including 'S1 eNB TEID' to the MME in response to the Initial Context Setup Request message.

7. The MME delivers the 'S1 eNB TEID' received from the eNB to the S-GW through a Modify Bearer Request message.

When this procedure is done, the generation of S1 bearer is completed between the eNB and the S-GW, and then all of the downlink EPS bearers ranging from the P-GW and the UE are configured. The UE may then receive downlink traffic data from the P-GW.

8. When a cell (E-UTRAN cell global Identifier; ECGI) where UE is located or tracking area (TAI) is changed, the S-GW informs a Modify Bearer Request message by transmitting it to the P-GW.

9. If necessary, the P-GW may perform an IP connectivity access network (IP-CAN) session modification procedure with a PCRF.

10. When receiving the Modify Bearer Request message from the S-GW, the P-GW transmits a Modify Bearer Response message to the S-GW in response to the message.

11. The S-GW transmits the Modify Bearer Response message to the MME in response to the Modify Bearer Request message.

A network-triggered Service Request procedure is usually performed when the network attempts to transmit downlink data to the UE staying in the ECM-IDLE state.

FIG. 13 is a diagram illustrating a network-triggered service request procedure in a wireless communication system to which the present invention can be applied.

1. When downlink data arrives at the P-GW via an external network, the P-GW delivers downlink data to the S-GW.

2. In the case that a downlink S1 bearer is unable to transmit downlink data to an eNB (i.e., 'S1 eNB TEID' value is not exist in the S-GW) since the downlink S1 bearer is released (i.e., ECM-IDLE state), the S-GW buffers the received downlink data. Furthermore, the S-GW transmits a Downlink Data Notification message to an MME/SGSN where the eNB is registered for signaling connection and bearer configuration to the corresponding UE.

The MME/SGSN transmits a Downlink Data Notification ACK message to the S-GW in response to the Downlink Data Notification message.

3. The MME/SGSN transmits a paging message to all eNB/RNC (or Base Station Controller; BSC) belonging to a tracking area where UE registered recently.

4. When the eNB/RNC (or BSC) receives the paging message from the MME/SGSN, the eNB/RNC (or BSC) broadcasts the paging message.

5. UE that identifies that there are downlink data toward itself configures ECM connection by performing a Service Request procedure. That is, in this case, the Service Request procedure is initiated by paging transmitted from network.

The Service Request procedure may be performed in the same way as the procedure of FIG. 12. In the case that the procedure is completed, the UE may receive downlink data from the S-GW.

6. When the paging response is received, the S-GW transmits "Stop Paging" message to the MME/SGSN.

When the MME/SGSN commands to transmit the paging transmission to the eNB/RNC (or BSC), the eNB/RNC (or BSC) calculates a paging occasion using an IMSI value and a DRX cycle of UE and transmits the paging message on the corresponding paging occasion. In the case that there is no response from the UE for a specific duration in response to the paging transmission, the MME may regard it as paging transmission failure and command a Paging retransmission to the eNB/RNC (or BSC) or cells.

That is, the Paging retransmission is determined in case that the Service request of UE is not received at the MME, and the eNB does not monitor whether the paging is received or retransmitted. In the case that the MME transmits the paging to a great many cells, since UE transmits a service request by being included in one of the cells, the eNB may determine that the corresponding UE is not existed in its cell.

Meanwhile, in the case that the MME/SGSN is unable to receive a response from the UE even after the paging repetition/retransmission procedure, the MME/SGSN notifies Paging failure to the S-GW using a Downlink Data Notification Reject message.

When the Downlink Data Notification Reject message is received, the S-GW may delete packet(s) which is buffered.

Periodic TAU Procedure

The Tracking Area Update (TAU) procedure is performed when the UE staying in the ECM-IDLE state attempts registering a new position or the TAU timer expires.

FIG. 14 illustrates a periodic tracking area update procedure in a wireless communication system to which the present invention can be applied.

1-2. When the TAU timer of the UE in the ECM-IDLE state expires, the Periodic TAU (P-TAU) procedure for reporting a Tracking Area (TA) to the MME is triggered.

The UE initiates the P-TAU procedure by transmitting a TAU Request message to the MME.

The TAU Request message is delivered being included in an RRC connection setup complete message through the RRC connection and is delivered being included in the initial UE message through the S1 signaling connection.

3. The MME which receives the TAU Request message resets the TAU timer and transmits a Modify Bearer Request message including an E-UTRAN Cell Global Identifier (ECGI) and a TAI to the S-GW.

4-5. In the case that the cell (ECGI) or the tracking area (TAI) in which the UE is located changes, the S-GW transmits the Modify Bearer Request message to the P-GW.

The P-GW performs an EPS session update procedure and transmits a Modify Bearer Response message to the S-GW in response to the Modify Bearer Request message.

6. The S-GW transmits a Modify Bearer Response message to the MME in response to the Modify Bearer Request message.

7-8. The MME transmits a TAU Accept message to the UE in response to the TAU Request message.

The TAU Accept message may include the TAU timer.

The TAU Accept message is delivered being included in a downlink NAS transport message through the S1 signaling connection and delivered being included in a downlink information (DL) transfer message through the RRC connection.

9. The MME that completes a position update of the UE releases connection to the UE used for transmission and reception of the periodic TAU-related message and transmits UE context release command to the eNB to release the user context set up within the E-UTRAN.

10. The eNB deletes the context of the UE and releases resources allocated to the UE. Furthermore, the eNB releases RRC connection to the UE by transmitting an RRC connection release message to the UE.

11. The eNB transmits UE context release complete message to the MME in response to UE context release command message, thereby releasing the S1 signaling connection between the eNB and the MME.

When the procedure above is completed, the UE again makes a transition to the ECM-IDLE state.

Discontinuous Reception (DRX) Mode

The 3GPP LTE/LTE-A system defines EPS Connection Management (ECM)-CONNECTED state and ECM-IDLE state to manage signaling connection between the UE and the network. The ECM-CONNECTED state and ECM-IDLE state can also be applied to the UE and the MME. ECM connection comprises RRC connection established between the UE and the eNB; and S1 signaling connection established between the eNB and the MME. RRC state shows whether the RRC layer of the UE is logically connected to the RRC layer of the eNB. In other words, in case the RRC layer of the UE and the RRC layer of the eNB are connected to each other, the UE stays in the RRC_CONNECTED state. On the other hand, if the RRC layer of the UE is not connected to the RRC layer of the eNB, the UE stays in the RRC_IDLE state.

At this time, the RRC_CONNECTED state refers to the state where the UE is connected to a particular cell and indicates that the UE can receive a service in the cell unit, where the UE is managed in units of cells.

RRC_IDLE state refers to the state where no connection is established between the UE and the eNB, but only the connection to a Mobility Management Entity (MME) is maintained; in the RRC_IDLE state, the UE is managed in the Tracking Area (TA) unit which is an area unit larger than a cell. In other words, the UE in the RRC_IDLE state wakes up intermittently and monitors the Paging Channel (PCH) to check whether there is a paging message being transmitted to the UE. In other words, the UE performs Discontinuous Reception (DRX) set up by the Non-Access Stratum (NAS) by using the ID allocated uniquely in the tracking area. The UE can receive a broadcast signal of the system information and paging information by monitoring a paging signal for a specific paging event at each UE-specific paging DRX cycle. The UE which does not receive any activated service through the aforementioned network state definitions eventually minimizes its power consumption, and thus the eNB can utilize resources in an efficient manner.

As described above, to receive general mobile communication services such as voice and data communication, the UE has to make a transition to the ECM-CONNECTED state. As in the case when the UE is first powered on, the initial UE stays in the ECM-IDLE state; if the UE successfully registers to the corresponding network through an initial attach procedure, the UE and the MME makes a transition to the ECM-CONNECTED state. Also, in case the UE has been registered to the network but radio resources are not allocated to the UE as traffic is not activated, the UE stays in the ECM-IDLE state; if uplink or downlink traffic is newly generated in the corresponding UE, the UE and the MME make a transition to the ECM-CONNECTED state through a Service Request procedure.

The 3GPP LTE/LTE-A system defines a dormant mode and an active mode even for the RRC_CONNECTED state to minimize power consumption of the UE.

According to the definition above, if the UE staying in the RRC_CONNECTED state does not transmit or receive data for a predetermined time period, cell connection is retained, but the UE is made to enter the dormant mode. The UE staying in the dormant mode has to occasionally wake up and monitor a physical control channel to receive data that may be transmitted to the UE.

As described above, a wireless communication system employs a Discontinuous Reception (DRX) scheme of the UE to minimize power consumption of the UE.

The DRX method defined in the 3GPP LTE/LTE-A system can be used both for the dormant mode and the RRC_IDLE mode, and the DRX methods used in the respective modes are as follows.

1) Dormant mode in the RRC_CONNECTED state
Short DRX: short DRX cycle (2 ms~640 ms)
Long DRX: long DRX cycle (10 ms~2560 ms)
2) RRC_IDLE state
Paging DRX: paging DRX cycle (320 ms~2560 ms)

The UE can perform monitoring of the PDCCH based on its unique identifier, RNTI (for example, C-RNTI, SI-RNTI, P-RNTI, and so on).

Monitoring of the PDCCH can be controlled by the DRX operation, and the eNB transmits the parameters related to the DRX to the UE through the RRC message. In particular, the UE has to always receive the SI-RNTI, P-RNTI, and so on irrespective of the DRX operation composed by the RRC message. At this time, the other PDCCHs excluding the PDCCH scrambled with the C-RNTI are always received through the common search space of a main serving cell (for example, Pcell).

If the DRX parameters are set up while the UE is in the RRC_CONNECTED state, the UE performs discontinuous monitoring of the PDCCH based on the DRX operation. On the other hand, if the DRX parameters are not set up, the UE performs continuous monitoring of the PDCCH.

In other words, the UE searches the PDCCH by performing blind decoding in a UE-specific search space of the PDCCH region based on the DRX operation. If no CRC error is detected when the UE unmasks the CRC of the PDCCH by using the RNTI, the UE regards that the corresponding PDCCH delivers the UE's control information.

Discontinuous PDCCH monitoring indicates that the UE monitors the PDCCH only in specific subframes, while continuous PDCCH monitoring indicates that the UE monitors the PDCCH for all of the subframes. Meanwhile, in case PDCCH monitoring is required in the operation unrelated to the DRX such as the random access procedure, the UE monitors the PDCCH according to the requirements of the corresponding operation.

Also, the UE receiving a paging message as described above can perform DRX to reduce power consumption.

To this purpose, the network configures a plurality of paging occasions for each time period called a paging cycle, a specific UE receives paging messages only at the time of specific paging occasions, and the UE does not receive a paging channel except for the specific paging occasions. Also, one paging occasion corresponds to one TTI.

Extended DRX (eDRX) is a function for extending a maximum of an existing paging DRX cycle of 2.56 ms to a maximum of several minutes to several tens of minutes in order to minimize power consumption of UE. The eDRX can be applied to an idle mode and a connected mode.

In the case of UE supporting eDRX mode, the state in which the UE is unreachable may mean the state in which the UE is unreachable by paging (i.e., a DRX duration in which the UE does not monitor a paging channel).

On the other hand, in the case of UE supporting eDRX mode, the state in which the UE is reachable may mean the state in which the UE is immediately reachable in ECM-CONNECTED mode and/or by paging (i.e., the interval in which the UE monitors a paging channel).

In other words, in eDRX mode, the UE may be determined to be temporarily unreachable even in an idle interval because DRX duration is relatively longer than that in DRX mode. That is, in the case that common DRX (2.56 seconds) is supported, data delivery is available after a maximum of 2.56 seconds. In the case that eDRX (e.g., 10 minutes) is applied, however, immediate data delivery is impossible because maximum delay is 10 minutes, which may be considered to be substantially unreachable.

Power Saving Mode

Power Saving Mode (PSM) is one of the 3GPP release-12 (rel-12) MTCe (Enhancement for MTC) features, and a function of minimizing power consumption of a UE by defining a duration in which the UE deactivates all of the Access Stratum (AS) operations such as paging reception and mobility management. In other words, a UE that supports the PSM may compromise with the network on the Active Time and periodic TAU timer or receive the Active Time and periodic TAU timer from the network during attach and tracking area update.

In the case that the UE receives the Active Time value from a network, when the UE is switched from the ECM-CONNECTED to the ECM-IDLE state, the UE receives a paging message by staying in the ECM-IDLE state during the corresponding Active Time period. Furthermore, when the Active Time period expires, the UE enters the PSM and deactivates all Access Stratum (AS) operations.

In addition, an MME initiates the Active timer by applying the Active Time value each time the UE enters ECM-IDLE mode. Furthermore, when the Active timer expires, the MME deduces that the UE is unreachable.

That is, the Active Time refers to the time period during which the UE supporting the state of using a power saving function (e.g., PSM) stays in the ECM-IDLE (or RRC_IDLE) state.

When the periodic TAU timer expires, the UE again enables the AS operation and performs the TAU, and the network stops the implicit detach timer of the corresponding UE. The UE may wake up anytime for a mobile-originated call (e.g., uplink data packet transfer).

Meanwhile, the UE wakes up at each P-TAU period and performs TAU to deal with mobile terminated calls (e.g., downlink data packet receiving), performs the paging receiving operation during the received Active Time, and again enters the PSM mode to sleep.

Tracking (Routing) Area Updating Method with an Inter-MME Mobility for a UE that Applies the Power Saying Function In the case that a UE that requires the minimization of power consumption like an MTC UE uses the power saving function (i.e., PSM or eDRX), the latency with respect to Network originated Service/Call may be increased. Accordingly, in 3GPP, a discussion has been progressed to increase the efficiency in a transmission in such a situation, recently.

Downlink Data Buffering Solution in an S-GW

As a solution for the scenario of Downlink packet transmission to UE applying power saving function, DL data buffering in an S-GW is proposed.

In the case that a UE uses the power saving function, when an MME detects it and receives a DDN message that notifies DL data arrival from an S-GW, the MME transmits a DDN ack that includes an indication requesting buffering of DL data. In this case, the MME may request to do buffering during T duration to the S-GW according to the PSM or the eDRX. Then, the S-GW buffers the corresponding data for a predetermined duration, not sending the DDN to the MME.

That is, when the UE becomes reachable again, the MME commands to buffer the DL data during T duration to the S-GW such that the UE is able to receive the stored information (i.e., DL data). In this case, in the case of the UE that applies the PSM, T duration may be configured as much as the remaining PSM duration. In addition, in the case of the UE that applies the eDRX, T duration may be configured by considering the eDRX period.

In the case of the UE that applies the eDRX, when paging becomes available again (by considering long DRX) (i.e., the corresponding UE becomes reachable), through the paging, the MME setup S1-U by commanding the E-RAB establishment. Later, the DL data buffered in the S-GW is transmitted to the UE.

In the case of the UE that applies the PSM, when the UE is reachable through a TAU, the MME setup S1-U by commanding the E-RAB establishment after completing the TAU procedure. Later, the DL data buffered in the S-GW is transmitted to the UE. This will be described in more detail with reference to FIG. 15 below.

FIG. 15 is a diagram illustrating a DL data transmission procedure in a wireless communication system to which the present invention can be applied.

0. This procedure is applied when a UE is in an ECM-IDLE state and unavailable potentially and temporally (e.g., a UE is in the PSM or eDRX state.).

1. An S-GW receives a DL packet for the UE from a P-GW.

2. The S-GW transmits a Downlink Data Notification (DDN) message to an MME, and starts a local timer.

3. The MME detects that the UE, which is a target of the received DDN, is in the power saving state or temporally unreachable, and command the S-GW to buffer the DL packet temporally.

The MME transmits a DDN Acknowledgement (DDN Ack) message including "DL buffering Requested", "DL Buffering duration T" and "Additional parameters" that are new message causes that the S-GW may assist to control the buffering of DL packet more accurately, to the S-GW. The "DL buffering duration T" stored in the Mobility Management (MM) context should be setup as follows.

In the case of the extended DRX (eDRX), the "DL buffering duration T" is a value not shorter than an extended DRX cycle.

In the case of the PSM, the "DL buffering duration T" is a value not shorter than the remaining time with respect to the periodic TAU (P-TAU) from a UE which is anticipated from the followings.

5. The S-GW tries to store the DL packet up to a specific amount, and starts the timer T for the corresponding device.

6. The MME establishes an E-UTRAN radio access bearer (E-RAB) by performing an initial context setup procedure in the next time when the UE initiates the NAS procedure.

a. In the case of the eDRX, the MME performs paging to the UE. The UE initiates a service request procedure (after a long time potentially), and when the UE responds to the paging, the E-RAB is established according to a general procedure (refer to FIG. 12).

b. In the case of the PSM/eDRX, the UE initiates a periodic TAU or a service request procedure due to the Mobile Originated (MO) data. When the UE initiates the TAU procedure after the new message cause "DL buffering requested" is delivered to the S-GW, the MME establishes the E-RAB.

In two cases above, the UE may initiate the TAU procedure with S-GW relocation. This will be described in detail below.

7. When the S-GW receives a Modify Bearer Request message from the MME (during the service request procedure or the TAU procedure), in the case that time T still operates, the S-GW stops timer T and deliver the buffered DL packet.

8. Bi-directional data communication is available.

T value may be selected based on subscriber requirements or vertical application requirements. The PSM state duration or the eDRX duration may be made by the subscriber requirements or the vertical application requirements. Unless both of the PSM and the eDRX are not used, T value may be in relation to delay tolerance by an application due to temporary coverage loss.

Inter-MME Mobility

In the DL data buffering solution in the S-GW described above, in the case that a UE applies the power saving function for a long time, the possibility that the mobility of UE occurs within the power saving function application time. In this case, the MME change and the S-GW change should be considered. That is, a discussion is required whether the buffered packet in the old S-GW should be delivered to a new S-GW. The previous solution proposes the procedure as shown in FIG. 16 below for the situation in which the S-GW is changed.

FIG. 16 illustrates a tracking area update procedure with S-GW change in a wireless communication system to which the present invention can be applied.

FIG. 16 exemplifies the case of an inter-MME TAU procedure.

1-3. In the case that TAU timer of a UE in an ECM-IDLE state expires or a UE moves to other tracking area, a TAU procedure is triggered for reporting the tracking area (TA) to an MME.

The UE initiates the TAU procedure by transmitting a TAU request message to the MME.

The TAU request message is delivered with being included in an RRC Connection Setup Complete message in an RRC connection, and delivered with being included in an Initial UE message in S1 signaling connection.

4. In the case that the MME that receives the TAU request message is different (i.e., in the case that the MME is changed) from an old node (i.e., MME or SGSN), a new MME transmits a Context Request message to the old MME/SGSN in order to obtain the information of UE from the old MME/SGSN.

5. When the Context Request message is transmitted to the old MME/SGSN, the old MME/SGSN responds with a Context Response message.

In this case, the old MME/SGSN indicates whether a DL data delivery is requested (i.e., "DL data forwarding required" when it is requested) to the new MME (SGSN in the case of RAU procedure).

6. The UE, the new MME and an HSS performs authentication function and security (or ciphering) procedure.

The new MME determines whether to relocate the S-GW. When the old S-GW is unable to provide a service to the UE anymore, the S-GW is relocated. In addition, the new MME may determine to relocate the S-GW when it is anticipated that the new S-GW provides a service to the UE longer and/or a P-GW path is more suitable to the UE, or when the new S-GW is co-located with the P-GW.

7. In the case that the MME selects the new S-GW, the MME transmits a Create Session Request message to the new S-GW which is selected for each PDN connection.

In the case that the new MME (SGSN in the case of RAU procedure) receives the "DL data forwarding request" in step 5 above, the new MME requests to assign a new S-GW temporary IP address (IP@) and TEID for forwarding DL data by forwarding the "DL data forwarding required" to the new S-GW.

8. If necessary, the new S-GW transmits a Modify Bearer Request message for each PDN connection to the P-GW.

9a. If necessary, the P-GW may perform an IP connectivity access network session modification procedure with a PCRF.

9. In the case that the P-GW receives the Modify Bearer Request message from the new S-GW, the P-GW transmits a Modify Bearer Response message to the new S-GW in response to it.

10. The new S-GW updates its own bearer context. Owing to it, the new S-GW may route to the P-GW when receiving a PDU from an eNB.

In response to the Create Session Request, the new S-GW transmits a Create Session Response message to the new MME.

In this case, the new S-GW forwards the temporary IP address (IP@) and the TEID allocated for forwarding DL data through the Create Session Response message to the new MME.

11. The new MME transmits a Context Acknowledge message to the old MME/SGSN.

In the case that the MME selects a new S-GW, the MME forwards modification indication information of the S-GW through the Context Acknowledge message to the old MME/SGSN. The modification indication information of the S-GW indicates that a new S-GW has been selected.

In this case, the new MME forwards the temporary IP address (IP@) and the TEID allocated for forwarding DL data through the Create Session Response message to the old MME/SGSN.

12. The new MME transmits an Update Location Request message to the HSS.

13. The HSS transmits a Cancel Location message to the old MME/SGSN.

14. The old MME/SGSN transmits a Cancel Location Acknowledge message to the HSS in response to the Cancel Location message.

15. In the case that the old SGSN receives the Context Acknowledge message and the UE is connected through an Iu interface, the old SGSN transmits an Iu Release Command message to an RNC.

16. The RNC transmits an Iu Release Complete message to the old SGSN in response to the Iu Release Command message.

17. In response to the Update Location Request message, the HSS transmits an Update Location Acknowledge message to the new MME.

18. In the case that the S-GW modification indication is received in the Context Acknowledge message of step 11, the old MME/SGSN releases the MME or SGSN EPS bearer resource by transmitting a Delete Session Request message to the old S-GW.

In this case, the old MME/SGSN forwards the temporary IP address (IP@) and the TEID allocated for forwarding DL data through the Delete Session Request message to the old S-GW.

19. In response to the Delete Session Request message, the old S-GW transmits a Delete Session Response message to the old MME/SGSN.

20. The new MME transmits a TAU Accept message to the UE. In this case, when the new MME allocates a new Globally Unique Temporary Identity (GUTI) to the UE, the allocated GUTI may be included in the TAU Accept message.

21. When the GUTI is included in the TAU Accept message, the UE transmits a TAU Complete message in response to the TAU Accept message to the MME.

22. The old S-GW forwards a buffered DL packet to the new S-GW, and transmits an End Marker packet indicating that there is no more data to forward to the new S-GW.

The solution (refer to FIG. 16) for the TAU/RAU operation of the solution (refer to FIG. 15) described above is focused on the operation of forwarding the data buffered in the old S-GW to the target S-GW by notifying the indication that DL data delivery is required when changing the S-GW to the target MME/S-GW, but the operation of the MME change is not properly considered therein.

That is, a detailed operation according to whether to relocate the S-GW is required. Accordingly, the present invention proposes information that an old MME indicates to a new MME and an operation performed according to whether to relocate the S-GW in the new MME in an inter-MME change.

Hereinafter, for the convenience of description, the present invention is mainly described for a tracking area update procedure, but it is understood that the present invention may be identically applied to a routing area update procedure.

Hereinafter, in the description of the present invention, the MME and the S-GW before the tracking area update (TAU) procedure is performed, which entails the MME change and the S-GW change, are referred to as an old MME and an old S-GW, respectively. And, the changed MME and the changed S-GW after the tracking area update (TAU) procedure is performed are referred to as a new MME and a new S-GW, respectively. The old MME and the old S-GW may also be referred to as a first MME and a first S-GW, respectively, and the new MME and the new S-GW may also be referred to as a second MME and a second S-GW, respectively.

FIG. 17 is a diagram illustrating a tracking area update procedure according to an embodiment of the present invention.

Referring to FIG. 17, step S1701 to step S1703 exemplify a DL buffering procedure (e.g., a part of a network trigger service request procedure) for a sleeping UE (i.e., a UE in the power saving state), and step S1704 to step S1708 exemplify a part of the operation of a tracking area update (TAU) procedure with an Inter-MME mobility.

Before the TAU procedure, an old MME receives a DL data notification (DDN) from an S-GW (step, S1701).

The old MME that detects the power saving state (e.g., the PSM or the eDRX) of the UE stores the state of the UE (step, S1702), and transmits a DDN acknowledgement (DDN ack) message to an old S-GW in response to a DDN message (step, S1703). Here, step S1702 may be simultaneously performed with step S1703, and the performance order may be interchanged.

In this case, the old MME that detects the power saving state (e.g., the PSM or the eDRX) of the UE may transmit "DL buffering requested" to the S-GW through the DDN ack message. Here, the "DL buffering requested" may instruct the S-GW to buffer the DL data.

In addition, the old MME may derive a prediction time when a radio bearer for the corresponding UE is established. And, the old MME may transmit the derived prediction time with being included in the DDN ack message as a "DL buffering duration" (i.e., T duration) to the S-GW. Here, the "DL buffering duration" (i.e., T duration) may indicate a buffering time of DL data in the S-GW as described above.

In this case, for the UE that applies the PSM, the remaining PSM duration may be determined to 'T' duration. For example, 'T' duration may have a value not less than the remaining time for the P-TAU from the UE expected later.

In addition, for the UE that applies the eDRX, the duration until the time (e.g., next paging trial time for the corresponding UE) when the UE is reachable again considering an extended DRX period may be determined to 'T' duration. For example, 'T' duration may have a value not less than an extended DRX cycle.

And, the old MME may store the record of transmitting the buffering request to the old S-GW in response to the DDN in a UE context (e.g., MM context and/or EPS bearer context).

That is, the "DL buffering requested" and/or the "DL buffering duration" may be stored in the UE context.

In this case, the old MME may store the same value as the "DL buffering duration" transmitted to the S-GW and may store as a value which is derived based on the "DL buffering duration" value transmitted to the S-GW.

Here, the information stored in the old MME may be referred to as "DL data buffer expiration time". That is, the "DL buffer expiration time" may indicate a time when buffering of DL data expires in the S-GW.

In addition, the MME may store the information on whether the power saving state of the UE is the PSM and/or the eDRX in the UE context.

The old S-GW that receives the DDN ack message including the "DL buffering requested" and/or the "DL data buffering duration time (T duration)" buffers DL data during received T duration.

Later, the UE moves to a new cell and initiates a TAU/RAU procedure according to the change of a tracking area. In this case, the MME change may occur. That is, the eNB that the UE is camping on may select a new MME.

In this case, the UE may initiate a TAU procedure by transmitting a TAU request message to the new MME through the eNB (or cell) that the UE is newly camping on (steps, S1704 and S1705).

At the moment, the TAU request message may be forwarded with being included in an RRC Connection Setup Complete message in an RRC connection, and may be forwarded with being included in an Initial UE message in an S1 signaling connection.

In the case that the MME is changed, the new MME transmits a Context Request message to the old MME in order to obtain the information of the UE (step, S1706).

In response to the Context Request message, the old MME transmits a Context Response message to the new MME (step, S1707).

At the moment, the old MME may transmit an indication that the downlink data is buffered in the S-GW (e.g., may be referred to as "Buffered data in S-GW" or "Buffered DL data waiting", etc.) in the Context Response message.

Such an indication means that there is/are data of which transmission is pending for the corresponding UE. That is, in the case that the UE is reachable, the indication is to notify that there is/are data required to be transmitted.

Such an indication may be transmitted with being included in an MME/SGSN UE EPS PDN Connections information of the Context Response message of GTP-C protocol, or may be transmitted by being defied as new information elements.

In addition, since the DL data buffered in the old S-GW is deleted when a DL Data Buffer Expiration Time (or DL buffering duration) expires, the old MME may not transmit such an indication to a new MME in the case that the DL Data Buffer Expiration Time (or DL buffering duration) expires.

In other words, in the case that the DL Data Buffer Expiration Time (or DL buffering duration) does not expires (i.e., valid), the old MME may transmit such an indication with being included in the Context Response message to the new MME.

Whereas the "DL data forwarding required" indication in FIG. 16 above indicates only the fact that the DL data to be transmitted to the UE should be transmitted from the old S-GW to the new S-GW, there is a difference in that the indication according to the present invention indicates that DL data is buffering in the S-GW.

That is, since DL data may be buffered in the S-GW without regard to whether the S-GW is changed, by indicating that DL data is buffering in the S-GW, the DL data may be reliably forwarded to the UE without regard to whether the S-GW is changed.

The new MME that receives a TAU request message from the UE determines whether to relocate (i.e., change) the S-GW (step, S1708).

And, in the case that it is required to relocate the S-GW, a DL data forwarding process (and E-RAB setup process) is required and in case that it is not required to relocate the S-GW, the E-RAB setup process is required.

1) First, the case that it is required to relocate the S-GW will be described.

In the case that it is required to relocate the S-GW, when a network supports a data forwarding with the S-GW, the new MME may setup a data forwarding path between the old S-GW and the new S-GW.

For example, by using the procedures from step 7 of the TAU/RAU procedure to step 19 of FIG. 16 described above, a direct forwarding path of DL data between the old S-GW and the new S-GW may be generated.

Through the data forwarding path between the old S-GW and the new S-GW generated as such, the DL data buffered in the old S-GW may be forwarded to the new S-GW.

In addition, the new MME performs the E-RAB (i.e., user plane) setup (or establishment) procedure together with the TAU/RAU procedure.

Through the E-RAB generated as above, DL data may be forwarded from the new S-GW to the UE.

FIG. 18 is a diagram illustrating a tracking area update procedure according to an embodiment of the present invention.

Particularly, FIG. 18 exemplifies an E-RAB setup procedure and a DL data forwarding procedure in the case that a relocation of an S-GW is required after step S1708 of FIG. 17 above.

Referring to FIG. 18, a new MME transmits an Initial Context Setup Request message to an eNodeB, and the eNodeB transmits an Initial Context Setup Complete message to a new MME in response to the Initial Context Setup Request message (step, S1801).

Here, step S1801 may be performed in the same way of step 4 to step 6 in FIG. 12 above.

The new MME transmits a Modify Bearer Request message to an old MME, and the old MME transmits a Modify Bearer Response message to the new MME in response to the Modify Bearer Request message (step, S1802).

Here, step S1802 may be performed in the same way of step 7 to step 11 in FIG. 12 above.

As such, a user plane (i.e., E-RAB bearer) may be established (or set) through steps S1801 and S1802.

Since an indication that DL data is buffering in the S-GW is received from the old MME through a Context Response message, the new MME setup a parameter for forwarding DL data by transmitting a Create Indirect Data Forwarding Tunnel Request message to the new S-GW (step, S1803).

Here, the Create Indirect Data Forwarding Tunnel Request message may include a target address for forwarding DL data and a Tunnel Endpoint Identifier (TEID).

In response to the Create Indirect Data Forwarding Tunnel Request message, the new S-GW transmits a Create Indirect Data Forwarding Tunnel Response message to the new MME (step, S1804).

Here, the Create Indirect Data Forwarding Tunnel Response message may include a target S-GW (e.g., new S-GW) address and a target S-GW TEID for forwarding DL data from the old MME to the new MME.

In this case, the indirect forwarding of DL data may be performed through an S-GW which is different from the S-GW used as an anchor point of a UE.

The new MME transmits a Context Acknowledge message to the old MME (step, S1805).

The Context Acknowledge message may include a TEID and a forwarding indication through which DL data should be forwarded. Here, the TEID may correspond to the TEID received in step S1804 (i.e., target S-GW TEID) or the TEID of the target eNodeB (in the case that the eNodeB supports the DL data forwarding).

The old MME transmits a Modify Bearer Request message to the old S-GW (step, S1806).

Here, the Modify Bearer Request message may include a TEID through which DL data should be forwarded.

The old S-GW transmits a Modify Bearer Response message to the old MME in response to the Modify Bearer Request message (step, S1807).

The old S-GW may transmit the data buffered by itself to the TEID received in step S1806. The buffered DL data may be transmitted to the UE through the radio bearer established in step S1801 above.

Meanwhile, in the case that DL data forwarding is unavailable between the old S-GW and the new S-GW, the new MME may complete the TAU/RAU procedure without performing the direct/indirect forwarding procedure and/or E-RAB establishment procedure.

For example, the new MME may determine a relocation of the S-GW, and start the direct/indirect forwarding procedure described above. In this case, the new MME may know the existence of an interface between the old S-GW and the new S-GW, and accordingly, may determine whether DL data forwarding is available. Accordingly, in the case that the new MME determines that it is impossible to forward DL data, the TAU/RAU procedure (refer to FIG. 16) may be performed without performing the operation exemplified in FIG. 18 above.

In this case, the buffered data of the old S-GW may be deleted when a DL Buffer Expiration Time (or DL Buffering duration) expires.

In addition, since the DL forwarding data indication is not included in the delete session request message above during the TAU/RAU procedure (refer to FIG. 16 above) (since it is impossible to forward data buffered in the S-GW), the old S-GW may delete the buffered data together with the UE context.

2) Next, the case that it is not required to relocate the S-GW will be described.

In the case that the S-GW relocation is not required, the new MME may identify the indication (e.g., "Buffered data in S-GW" or "Buffered DL data waiting") that DL data is buffering in the S-GW received through a Context Response message from the old MME as an E-RAB setup indication.

And, the new MME performs the E-RAB (i.e., user plane) setup (or establishment) procedure together with the TAU/RAU procedure.

For example, through steps S1801 and S1802 of FIG. 18 above, a user plane (i.e., E-RAB bearer) may be established (or set).

This may be performed without regard to the type of power saving function (e.g., PSM or eDRX) of a UE.

Accordingly, the S-GW does not transmit an additional DDN message to the new MME for the DL data of which a DL Buffer Expiration Time (or DL Buffering duration) is valid (i.e., not expired).

And, the new MME performs the E-RAB setup procedure without regard to whether a DDN message is received from the S-GW, and thus, the DL data buffered in the S-GW is forwarded to the UE.

FIG. 19 is a diagram illustrating a method for performing a tracking area update according to an embodiment of the present invention.

Referring to FIG. 19, a first MME (e.g., old MME) receives a Context Request message from a second MME (e.g., new MME) (step, S1901).

In response to the Context Request message, the first MME transmits a Context Response message to the second MME (step, S1902).

Here, in the Context Response message, an indication (e.g., "Buffered data in S-GW" or "Buffered DL data waiting") that there are DL data buffered in the S-GW may be included.

In the case that a UE applying the power saving function (e.g., PSM or eDRX) is unreachable as described above, the MME transmits a DDN ack message including a DL buffering Requested and/or buffering time (e.g., DL Data Buffering Duration Time) to the S-GW in response to the DDN message received from the S-GW. In addition, since the MME stores a buffering time (e.g., DL Buffer Expiration Time), when the buffering time is not expired, an indication that there is/are DL data buffered in the S-GW may be included in the Context Response message.

In other words, the indication that there is/are DL data buffered in the S-GW may also be included in the Context Response message in the case that DL data is existed in the S-GW and the buffering time (DL Buffer Expiration Time or DL Buffering duration) is not expired (i.e., valid). This is because the DL data buffered in the S-GW may be deleted when the buffering time expires, and the fact that the buffering time is not expired means that there is/are DL data in the S-GW.

On the contrary, since the DL data buffered in the S-GW may be deleted when the buffering time expires (i.e., not valid) as described above, an indication that there is/are DL data buffered in the S-GW may not be included in the Context Response message.

FIG. 20 is a diagram illustrating a method for performing a tracking area update according to an embodiment of the present invention.

Referring to FIG. 20, a second MME (e.g., new MME) transmits a Context Request message to a first MME (e.g., old MME) (step, S2001).

In response to the Context Request message, the second MME receives a Context Response message from the first MME (step, S2002).

When receiving an indication that there is/are DL data buffered in the S-GW through the Context Response message, the second MME performs an E-RAB setup procedure in order to forward DL data buffered in the S-GW (step, S2003).

Here, the second MME may perform an E-RAB setup procedure in order to forward DL data buffered in the S-GW to a UE without regard to whether to receive a DDN message for the corresponding DL data from the S-GW.

In this case, the E-RAB setup procedure may be performed together with the TAU procedure. That is, the E-RAB setup procedure is not initiated after the TAU procedure is terminated, but the E-RAB setup procedure and the TAU procedure may be performed at the same time.

As described above, the indication that there is/are DL data buffered in the S-GW may also be included in the Context Response message in the case that DL data is existed in the S-GW and the buffering time (DL Buffer Expiration Time or DL Buffering duration) is not expired (i.e., valid). This is because the DL data buffered in the S-GW may be deleted when the buffering time expires, and the fact that the buffering time is not expired means that there is/are DL data in the S-GW.

On the contrary, since the DL data buffered in the S-GW may be deleted when the buffering time expires (i.e., not valid) as described above, an indication that there is/are DL data buffered in the S-GW may not be included in the Context Response message.

Overview of Devices to which the Present Invention can be Applied

FIG. 21 illustrates a block diagram of a communication device according to one embodiment of the present invention.

With reference to FIG. 21, a wireless communication system comprises a network node 2110 and a plurality of UEs 2120.

A network node 2110 comprises a processor 2111, memory 2112, and communication module 2113. The processor 2111 implements proposed functions, processes and/or methods proposed through FIG. 1 to FIG. 20. The processor 2111 can implement layers of wired/wireless interface protocol. The memory 2112, being connected to the processor 2111, stores various types of information for driving the processor 2111. The communication module 2113, being connected to the processor 2111, transmits and/or receives wired/wireless signals. Examples of the network node 2110 include an eNB, MME, HSS, SGW, PGW, Application Server and so on. In particular, in case the network node 2110 is an eNB, the communication module 2113 can include an Radio Frequency (RF) unit for transmitting/receiving a radio signal.

The UE 2120 comprises a processor 2121, memory 2122, and communication module (or RF unit) 2123. The processor 2121 implements proposed functions, processes and/or methods proposed through FIG. 1 to FIG. 20. The processor 2121 can implement layers of wired/wireless interface protocol. The memory 2122, being connected to the processor 2121, stores various types of information for driving the processor 2121. The communication module 2123, being connected to the processor 2121, transmits and/or receives wired/wireless signals.

The memory 2112, 2122 can be installed inside or outside the processor 2111, 2121 and can be connected to the processor 2111, 2121 through various well-known means. Also, the network node 2110 (in the case of an eNB) and/or the UE 2120 can have a single antenna or multiple antennas.

FIG. 22 illustrates a block diagram of a communication device according to an embodiment of the present invention.

Particularly, FIG. 22 is a diagram illustrating the UE of FIG. 21 above in more detail.

Referring to FIG. 22, the UE includes a processor (or a Digital Signal Processor (DSP)) 2210, an RF module (or RF unit) 2235, a power management module 2205, an antenna 2240, a battery 2255, a display 2215, a keypad 2220, a memory 2230, a Subscriber identification Module (SIM) card 2225 (this component is optional), a speaker 2245, and a microphone 2250.

The processor 2210 implements proposed functions, processes and/or methods proposed through FIG. 1 to FIG. 20. The memory 2230 may be installed inside or outside the processor 2210 and may be connected to the processor 2210 through various well-known means.

The memory 2230 is connected to the processor 2210, and stores the information in relation to the operation of the processor 2210. The memory 2230 may be installed inside or outside the processor 2210 and may be connected to the processor 2210 through various well-known means.

The user enters command information such as a phone number, for example, by pressing (or touching) buttons of the keypad 2220 or by voice activation on the microphone 2250. The processor 2210 receives the command information and performs an appropriate function such as dialing. The operational data may be extracted from the SIM card 2225 or the memory 2230. Also, the processor 2210 may display the command information and the operation information on the display 2215, for the user reference and convenience.

An RF module 2235 transmits and receives an RF signal, being connected to the processor 2210. In order to initiate a communication, for example, the processor 2210 forwards command information to transmit a radio signal that constructs voice communication data to the RF module 2235. The RF module 2235 includes a receiver and a transmitter in order to receive and transmit a radio signal. An antenna 2240 functions to transmit and receive a radio signal. When receiving a radio signal, the RF module 2235 may forward a signal in order for a signal to be processed by the processor 2210, and may transform the signal in a baseband. The processed signal may be transformed to be audible or readable information.

The embodiments described above are a combination of constituting elements and features of the present invention in particular forms. Unless otherwise specified, each constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

Embodiments according to the present invention can be realized by various means, for example, hardware, firmware, software, or a combination thereof. In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function performing operations described above. Software codes can be stored in a memory unit and executed by a processor. The memory unit, being located inside or outside the processor, can communicate data with the processor through various means known in the fields of the art.

It should be clearly understood by those skilled in the art that the present invention can be realized in a different, particular form as long as the present invention retains the essential features of the present invention. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

INDUSTRIAL APPLICABILITY

The paging transmission method in a wireless communication system of the present invention has been described mainly with the example applied to 3GPP LTE/LTE-A system, but may also be applied to various wireless communication systems except the 3GPP LTE/LTE-A system.

The invention claimed is:

1. A method for performing a Tracking Area Update (TAU) with a Mobility Management Entity (MME) change performed by a second MME in a wireless communication system, the method comprising:

transmitting a Context Request message to a first MME during the TAU procedure;

receiving a Context Response message from the first MME in response to the Context Request message; and when the second MME receives information that there are downlink data buffered in a Serving Gateway (S-GW) through the Context Response message, performing an evolved terrestrial radio access network (E-UTRAN) Radio Access Bearer setup procedure in order to deliver the downlink data buffered in the S-GW even when a Downlink Data Notification (DDN) message is not received from the S-GW.

2. The method of claim 1, wherein an information that there are downlink data buffered in the S-GW is included in the Context Response message, when the downlink data is buffered in the S-GW and a buffering time of the downlink data, which is stored in the first MME, is not expired.

3. The method of claim 2, wherein the information that there are downlink data buffered in the S-GW is not included in the Context Response message, when a buffering time of the downlink data, which is stored in the first MME, expires.

4. A second Mobility Management Entity (MME) performing a Tracking Area Update (TAU) with an MME change in a wireless communication system, the second MME comprising:

a transmitter and a receiver; and a processor, operatively coupled to the transmitter and the receiver, wherein the processor is configured to:

control the transmitter to transmit a Context Request message to a first MME during the TAU procedure;

control the receiver to receive a Context Response message from the first MME in response to the Context Request message; and when the second MME receives information that there are downlink data buffered in a Serving Gateway (S-GW) through the Context Response message, perform an evolved terrestrial radio access network (E-UTRAN) Radio Access Bearer setup procedure in order to deliver the downlink data buffered in the S-GW even when a Downlink Data Notification (DDN) message is not received from the S-GW.

* * * * *

UNITED STATES PATENT AND TRADEMARK OFFICE
CERTIFICATE OF CORRECTION

| | | |
|---|---|---|
| PATENT NO. | : 10,375,564 B2 | Page 1 of 1 |
| APPLICATION NO. | : 15/543920 | |
| DATED | : August 6, 2019 | |
| INVENTOR(S) | : Ryu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this
Thirty-first Day of December, 2019

Andrei Iancu
*Director of the United States Patent and Trademark Office*